(12) United States Patent
Goyal

(10) Patent No.: US 11,044,124 B1
(45) Date of Patent: Jun. 22, 2021

(54) DYNAMIC MODULE AND DECISION FEEDBACK EQUALIZER

(71) Applicant: FARADAY TECHNOLOGY CORPORATION, Hsinchu (TW)

(72) Inventor: Prateek Kumar Goyal, Hsinchu (TW)

(73) Assignee: FARADAY TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/128,266

(22) Filed: Dec. 21, 2020

(51) Int. Cl.
*H04L 25/03* (2006.01)
*H04L 7/033* (2006.01)

(52) U.S. Cl.
CPC ........ *H04L 25/03057* (2013.01); *H04L 7/033* (2013.01); *H04L 25/03146* (2013.01); *H04L 25/03267* (2013.01); *H04L 25/03885* (2013.01); *H04L 2025/0349* (2013.01)

(58) Field of Classification Search
CPC ............... H04L 7/033; H04L 25/03006; H04L 25/03057; H04L 25/03146; H04L 25/03267; H04L 25/03885; H04L 2025/0349
USPC ............... 375/232, 233, 260, 346, 348, 349; 333/28 R, 142, 143; 708/322, 323
See application file for complete search history.

(56) References Cited

U.S. PATENT DOCUMENTS

| | | | |
|---|---|---|---|
| 9,083,577 B2 | 7/2015 | Maheshwari et al. | |
| 2002/0097682 A1* | 7/2002 | Enam | H03K 19/01812 370/241 |
| 2013/0028313 A1* | 1/2013 | Shen | H04L 25/03057 375/233 |
| 2014/0226707 A1* | 8/2014 | Kaviani | H04L 25/03063 375/233 |
| 2015/0029876 A1* | 1/2015 | Ogata | H04J 3/047 370/252 |
| 2015/0103875 A1* | 4/2015 | Thakkar | H04L 25/03057 375/233 |
| 2018/0248577 A1* | 8/2018 | Hossain | H04L 25/0264 |
| 2020/0366541 A1* | 11/2020 | Hossain | H04L 27/2057 |

* cited by examiner

*Primary Examiner* — Young T. Tse
(74) *Attorney, Agent, or Firm* — WPAT, PC

(57) ABSTRACT

A dynamic module and a decision feedback equalizer are provided. The decision feedback equalizer includes two dynamic modules, which have symmetric circuits and connections. The dynamic module includes a first domino circuit, a second domino circuit, and a storage circuit. In response to a first previous decision bit and a second previous decision bit, a first multiplexer output and a second multiplexer output are generated. The dynamic module alternatively operates in an evaluation period and a precharge period, depending on a clock signal. In the evaluation period, the first and the second multiplexer outputs are updated by the first domino circuit and the second domino circuit. In the precharge period, the first and the second multiplexer outputs are held by the storage circuit.

22 Claims, 27 Drawing Sheets

| figure | operation period | input signals of dynamic latch ||||| input signals of multiplexer |||| multiplexer output ||
| | | latch clock signals || previous decision bits || rail-outputs |||| | |
| | | CLK_L | CLKB_L | Spo | SBpo | AP | AN | BP | BN | MXOP | MXON |
| FIG. 9 | precharge | 0 | 1 | X | X | X | X | X | X | maintain | maintain |
| FIG. 10A | evaluation | 1 | 0 | 0 | 1 | X | X | 0 | 1 | 0(=BN) | 1(=BP) |
| FIG. 10B | evaluation | 1 | 0 | 1 | 0 | 0 | 1 | X | X | maintain | maintain |
| | | | | | | 1 | 0 | X | X | 0(=AN) | 1(=AP) |

FIG. 11

| figure | operation period | latch clock signals | | previous decision bits | | input signals of multiplexer rail-outputs | | | | selection signals | | | | multiplexer output | |
|---|---|---|---|---|---|---|---|---|---|---|---|---|---|---|---|
| | | CLK_L | CLKB_L | Spo | SBpo | AP | AN | BP | BN | sa_p | sa_n | sb_p | sb_n | MXOP | MXON |
| FIG. 14 | precharge | 0 | 1 | X | X | X | X | X | X | 1 | 0 | 1 | 0 | maintain | maintain |
| FIG. 15A | evaluation | 1 | 0 | 0 | 1 | 0 | 1 | X | X | 0 | 1 | Z | Z | AP | AN |
| | | | | | | 1 | 0 | X | X | | | | | | |
| FIG. 15B | evaluation | 1 | 0 | 1 | 0 | X | X | 0 | 1 | Z | Z | 0 | 1 | BP | BN |
| | | | | | | X | X | 1 | 0 | | | | | | |

| figure | operation period | input signals of dynamic latch | | | | input signals of multiplexer | | | | selection signals | | | | multiplexer output | |
|---|---|---|---|---|---|---|---|---|---|---|---|---|---|---|---|
| | | latch clock signals | | previous decision bits | | rail-outputs | | | | | | | | | |
| | | CLK_L | CLKB_L | Spo | SBpo | AP | AN | BP | BN | sa_p | sa_n | sb_p | sb_n | MXOP | MXON |
| FIG. 20 | precharge | 0 | 1 | X | X | X | X | X | X | 1 | 0 | 1 | 0 | maintain | maintain |
| FIG. 21A | evaluation | 1 | 0 | 0 | 1 | 0 | 1 | X | X | 0 | 1 | Z | Z | AP | AN |
| | | | | | | 1 | 0 | X | X | | | | | | |
| FIG. 21B | | | | 1 | 0 | X | X | 0 | 1 | Z | Z | 1 | 0 | BP | BN |
| | | | | | | X | X | 1 | 0 | | | | | | |

US 11,044,124 B1

DYNAMIC MODULE AND DECISION FEEDBACK EQUALIZER

TECHNICAL FIELD

The disclosure relates in general to a dynamic module and a decision feedback equalizer, and more particularly to a dynamic module and a decision feedback equalizer capable of alleviating timing margin for the speculative first-tap (tap1) in a receiver.

BACKGROUND

FIG. 1 is a schematic diagram illustrating the transmission path between a transmitter and a receiver. The transmitter 11 transmits data to the receiver 13, but the data is distorted during the transmission path 12. Thus, the receiver 13 needs to recover the distorted data. The causes of the distortion are various, and the inter-symbol interference (hereinafter, ISI) is one of the undesired distortions caused by precedent symbols.

To reduce the ISI, a continuous-time linear equalizer (hereinafter, CTLE) 131, and a decision feedback equalizer (hereinafter, DFE) 133 have been developed and utilized in the receiver 13. In short, the CTLE 131 adjusts the gain in frequency domains, and the DFE 133 settles the signals resulting from ISI without amplifying noise. Therefore, the combination of CTLE 131 and DFE 133 can remove ISI and enhance signal-to-noise ratio (hereinafter, SNR). Then, the DFE output $D_{out}$ is transmitted to Serializer/Deserializer (hereinafter, SerDes) 135.

FIG. 2 is a schematic diagram illustrating the structure of DFE. The DFE 133 includes a summer 133a, a sense amplifier 133b, and an RS latch 133c. The summer 133a receives the input data $D_{in}$ and a speculative first-tap (tap1). The summation of the input data $D_{in}$ and the speculative first-tap (tap1) is transmitted to the sense amplifier 133b. The sense amplifier 133b and the RS latch 133 are activated by a clock signal CLK.

The sense amplifier 133b outputs the amplified signals to the RS latch 133c, and the RS latch 133c generates the DFE output $D_{out}$. As the DFE 133 involves several steps, and the DFE 133 needs to adjust its operation immediately and recursively, the design of the DFE 133 is relatively complicated. In high-frequency (for example, higher than 10 GHz) applications, taps speed is critical, and the design of the DFE 133 encounters challenges.

SUMMARY

The disclosure is directed to a dynamic module and a decision feedback equalizer. A multiplexer and a dynamic latch are effectively merged in the dynamic module to reduce the propagation delay and to alleviate the operating margin of the speculative first-tap (tap1).

According to one embodiment, a dynamic module is provided. The dynamic module includes a first domino circuit and a second domino circuit. The first domino circuit generates a first multiplexer output, and the second domino circuit generates a second multiplexer output. The first domino circuit includes a first multiplexer, at least one first phase setting circuit, and a first decision selection stage. The first multiplexer receives two of a first, a second, a third, and a fourth rail-outputs. The at least one first phase setting circuit receives a first clock signal. The first decision selection stage is electrically connected to the first multiplexer and the at least one first phase setting circuit. The first decision selection stage receives a first previous decision bit and a second previous decision bit, wherein the first previous decision bit and the second previous decision bit are complementary. The second domino circuit is electrically connected to the first domino circuit. The second domino circuit includes a second multiplexer, at least one second phase setting circuit, and a second decision selection stage. The second multiplexer receives the other two of the first, the second, the third, and the fourth rail-outputs. The at least one second phase setting circuit receives a second clock signal, wherein the first clock signal and the second clock signal are complementary. The second decision selection stage is electrically connected to the second multiplexer and the at least one second phase setting circuit. The second decision selection stage receives the first previous decision bit and the second previous decision bit. The first and the second multiplexer outputs are selectively updated with the first, the second, the third, and the fourth rail-outputs in the evaluation period, and the first and the second multiplexer outputs remain unchanged in the precharge period.

According to another embodiment, a decision feedback equalizer is provided. The decision feedback equalizer includes a first speculative path and a second speculative path. The first speculative path provides a first previous decision bit and a second previous decision bit in an evaluation period, wherein the first previous decision bit and the second previous decision bit are complementary. The second speculative path is electrically connected to the first speculative path. The second speculative includes a first sense amplifier, a second sense amplifier, and the dynamic module. The first sense amplifier outputs a first rail-to-rail output pair, including a first rail-output and a second rail-output. The second sense amplifier outputs a second rail-to-rail output pair including a third rail-output and a fourth rail-output. The dynamic module is electrically connected to the first sense amplifier and the second sense amplifier.

BRIEF DESCRIPTION OF THE DRAWINGS

FIG. 11 is a summary table listing signal states of the dynamic module in the precharge period $T_{pre}$ and in the evaluation period $T_{eva}$ according to the first embodiment of the present disclosure.

FIG. 17 is a summary table listing signal states of the dynamic module in the precharge period $T_{pre}$ and in the evaluation period $T_{eva}$ according to the second embodiment of the present disclosure.

FIG. 23 is a summary table listing signal states of the dynamic module in the precharge period $T_{pre}$ and in the evaluation period $T_{eva}$ according to the third embodiment of the present disclosure.

Figure 1:
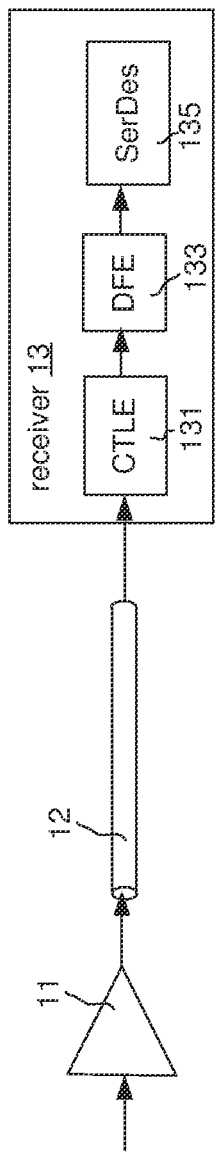
FIG. 1 (prior art) is a schematic diagram illustrating the transmission path.
Figure 2:
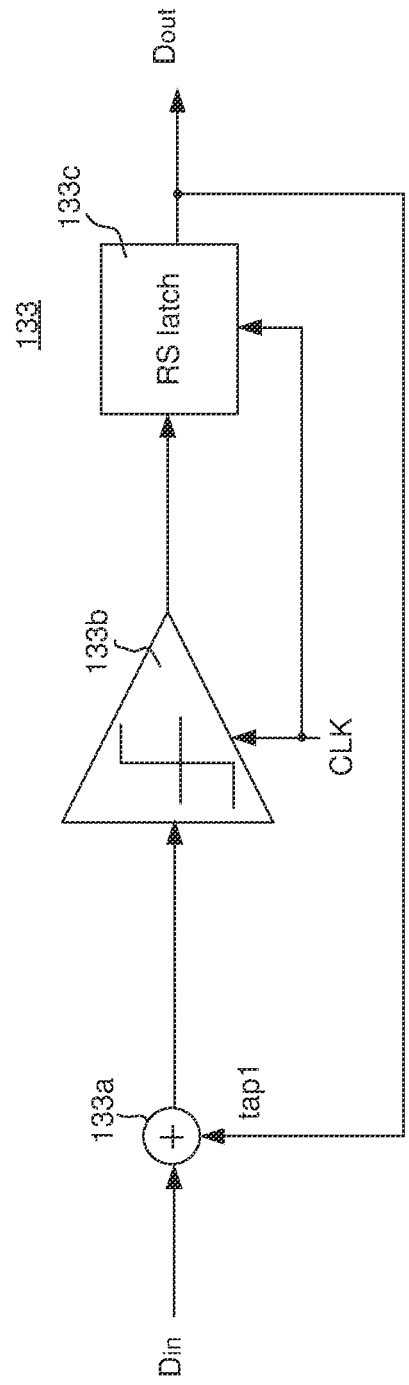
FIG. 2 (prior art) is a schematic diagram illustrating the structure of DFE.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Among the taps, the first-tap (tap1) has the most critical timing limitation, that is, one data unit interval (hereinafter, UI). The speculative (loop-unrolling) technique is used in DFE design to relax the timing limit of the first-tap (tap1). Based on the speculative structure, the DFE includes an even speculative path and an odd speculative path, and the timing limit of the speculative first-tap (tap1) can be extended to two data unit intervals (2*UI).

Figure 3:
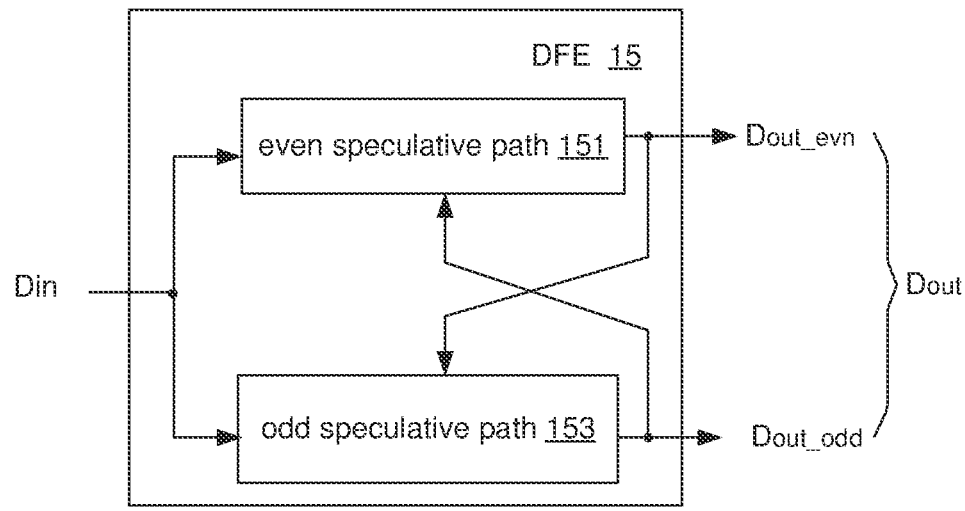
FIG. 3 is a schematic diagram illustrating the speculative DFE.

FIG. 3 is a schematic diagram illustrating the speculative DFE. The DFE 15 includes an even speculative path 151 and an odd speculative path 153. The even speculative path 151 receives the input data $D_{in}$ and generates the even-path decision $D_{out\_evn}$, wherein the even-path decision $D_{out\_evn}$ is further fed to and referred by the odd speculative path 153. The odd speculative path 153 receives the input data $D_{in}$ and generates the odd-path decision $D_{out\_odd}$, wherein the odd-path decision $D_{out\_odd}$ is further fed to and referred by the even speculative path 151. The even-path decision $D_{out\_evn}$ and the odd-path decision $D_{out\_odd}$ are alternatively considered as the DFE output $D_{out}$.

Figure 4:
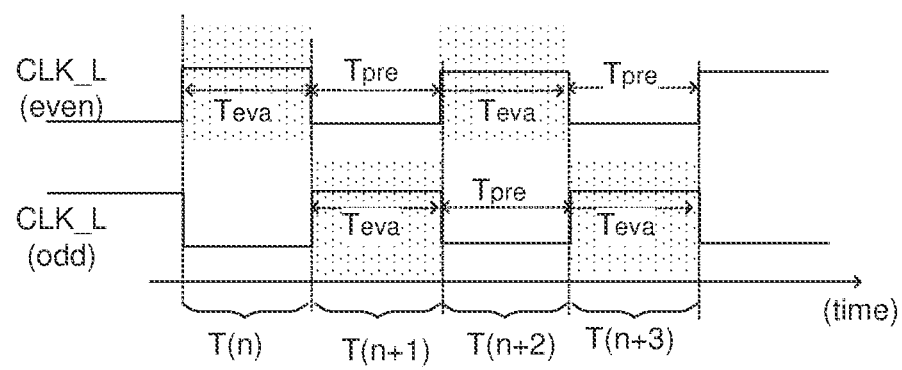
FIG. 4 is a schematic waveform diagram illustrating the alternate operation periods of the even speculative path and the odd speculative path.

FIG. 4 is a schematic waveform diagram illustrating the alternate operation periods of the even speculative path and the odd speculative path. The horizontal axis represents time, and the vertical axis represents waveforms of the even-path non-inverted latch clock signal CLK_L(even) and the odd-path non-inverted latch clock signal CLK_L(odd). The even-path non-inverted latch clock signal CLK_L(even) is provided to the even speculative path 151, and the odd-path non-inverted latch clock signal CLK_L(odd) is provided to the odd speculative path 153.

When the even-path non-inverted latch clock signal CLK_L(even) is in logic high (CLK_L(even)=1), the even speculative path 151 operates in an evaluation phase. The duration when the even speculative path 151 operates in the evaluation phase is defined as an evaluation period $T_{eva}$ corresponding to the even speculative path 151. When the even-path non-inverted latch clock signal CLK_L(even) is in logic low (CLK_L(even)=0), the even speculative path 151 operates in a precharge phase. The duration when the even speculative path 151 operates in the precharge phase is defined as a precharge period $T_{pre}$ corresponding to the even speculative path 151.

When the odd-path non-inverted latch clock signal CLK_L(odd) is in logic high (CLK_L(odd)=1), the odd speculative path 153 operates in an evaluation phase. The duration when the odd speculative path 153 operates in the evaluation phase is defined as an evaluation period $T_{eva}$ corresponding to the odd speculative path 153. When the odd-path non-inverted latch clock signal CLK_L(odd) is in logic low (CLK_L(odd)=0), the odd speculative path 153 operates in a precharge phase. The duration when the odd speculative path 153 operates in the precharge phase is defined as a precharge period $T_{pre}$ corresponding to the odd speculative path 153.

The even-path non-inverted latch clock signal CLK_L (even) and the odd-path non-inverted latch clock signal CLK_L(odd) are complementary, and the operation phases of the even speculative path 151 and the odd speculative path 153 are alternatively switched. In durations T(n), T(n+2), the even speculative path 151 operates in the evaluation phase, and the odd speculative path 153 operates in the precharge phase. In durations T(n+1), T(n+3), the even speculative path 151 operates in the precharge phase, and the odd speculative path 153 operates in the evaluation phase. Accordingly, when the even speculative path 151 is in the evaluation period $T_{eva}$, the odd speculative path 153 is in the precharge period $T_{pre}$, and vice versa.

Figure 5A:
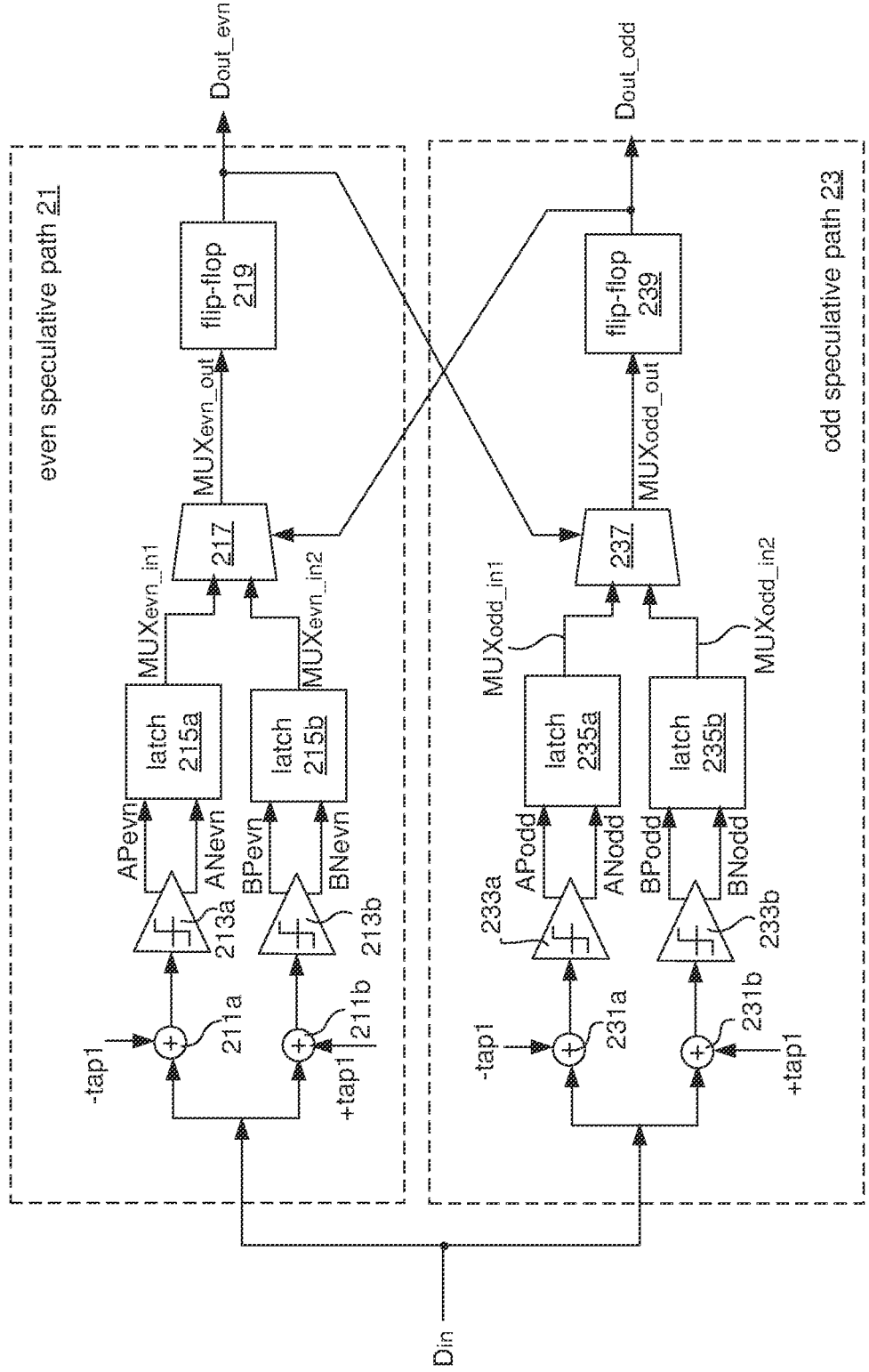
FIG. 5A is a schematic diagram illustrating an exemplary speculative DFE.
Figure 5B:
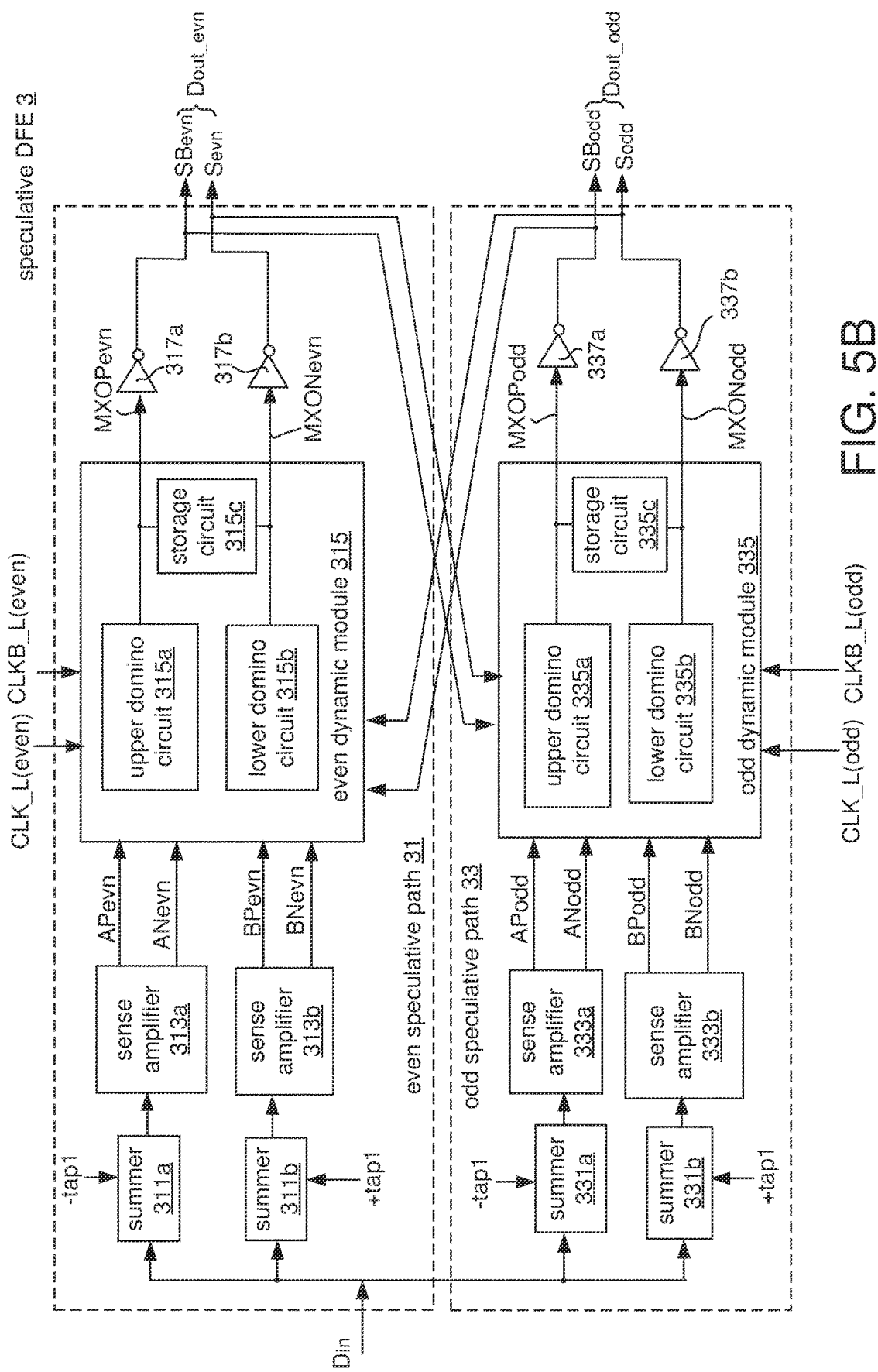
FIG. 5B is a schematic diagram illustrating another speculative DFE.

Two exemplary speculative DFEs having loop-unrolling structures are shown in FIGS. 5A and 5B. FIGS. 5A and 5B demonstrate that the even speculative path 151 and the odd speculative path 153 have similar and symmetric designs.

FIG. 5A is a schematic diagram illustrating an exemplary speculative DFE. The speculative DFE 2 includes an even speculative path 21 and an odd speculative path 23. The even speculative path 21 includes summers 211a, 211b, sense amplifiers 213a, 213b, latches 215a, 215b, a multiplexer 217, and a flip-flop 219. The odd speculative path 23 includes summers 231a, 231b, sense amplifiers 233a, 233b, latches 235a, 235b, a multiplexer 237, and a flip-flop 239.

The sense amplifiers 213a, 213b, 233a, 233b are respectively clocked with their corresponding latch clock signals CLK_L, and each of the sense amplifiers 213a, 213b, 233a, 233b has a differential input and dual-rail outputs. The operations of the sense amplifiers 213a, 213b in the even speculative path 21 and the operations of the sense amplifiers 233a, 233b in the odd speculative path 23 are symmetric. For example, when the even-path non-inverted latch clock signal CLK_L(even) is in logic high, the sense amplifiers 213a, 213b proceed sample and hold operation, and the sense amplifiers 233a, 233b suspend their operation, and vice versa. When the sense amplifiers 213a, 213b, 233a, 233b proceed the sample and hold operation, one of the two outputs of the same sense amplifier 213a, 213b, 233a, 233b is set to an amplifier supply voltage level (logic high) (depending on the polarity of the input differential voltage), and the other of the two outputs of the same sense amplifier 213a, 213b, 233a, 233b remains at the amplifier ground voltage level (logic low).

The even speculative path 21 and the odd speculative path 23 alternatively receive the input data $D_{in}$ and generate their corresponding even-path decision $D_{out\_evn}$ and odd-path decision $D_{out\_odd}$ in response. The odd speculative path 23 receives the even-path decision $D_{out\_evn}$ from the even speculative path 21, and the even speculative path 21 receives the odd-path decision $D_{out\_odd}$ from the odd speculative path 23.

The operations of the even speculative path 21 of the DFE 2 are illustrated. The summers 211a, 211b simultaneously receive the input data $D_{in}$ and the speculative first-tap (tap1). After subtracting the speculative first-tap (tap1) from the input data $D_{in}$, the summer 211a transmits its summer output ($D_{in}$−tap1) to the sense amplifier 213a. After adding the speculative first-tap (tap1) to the input data $D_{in}$ ($D_{in}$+tap1), the summer 211b transmits its summer output ($D_{in}$+tap1) to the sense amplifier 213b.

The sense amplifier 213a further generates a first even-path positive rail-output APevn and a first even-path negative rail-output ANevn based on the summer output ($D_{in}$−tap1) of the summer 211a. The sense amplifier 213b further generates a second even-path positive rail-output BPevn and a second even-path negative rail-output BNevn based on the summer output ($D_{in}$+tap1) of the summer 211b.

The latch 215a receives the first even-path positive rail-output APevn and the first even-path negative rail-output ANevn from the sense amplifier 213a and accordingly generates an even-path multiplexed input $MUX_{evn\_in1}$. The latch 215b receives the second even-path positive rail-output BPevn and the second even-path negative rail-output BNevn from the sense amplifier 213b and accordingly generates another even-path multiplexed input $MUX_{evn\_in2}$. The multiplexer 217 selects one of the multiplexed inputs $MUX_{evn\_in1}$, $MUX_{evn\_in2}$, as its multiplexed output $MUX_{evn\_out}$, according to the odd-path decision $D_{out\_odd}$. The multiplexed output $MUX_{evn\_out}$ is further transmitted to the flip-flop 219. The flip-flop 219 provides the even-path decision $D_{out\_evn}$ to the odd speculative path 23.

The operations of the odd speculative path 23 are similar to those of the even speculative path 21, and details are omitted. Please note that, the source and weights of the speculative first-tap (tap1) are not limited. Moreover, the speculative DFE might have more taps.

FIG. 5B is a schematic diagram illustrating another speculative DFE. The speculative DFE 3 includes an even speculative path 31 and an odd speculative path 33. The even speculative path 31 includes summers 311a, 311b, sense amplifiers 313a, 313b, an even dynamic module 315, and inverters 317a, 317b. The odd speculative path 33 includes summers 331a, 331b, sense amplifiers 333a, 333b, an odd dynamic module 335, and inverters 337a, 337b.

The even dynamic module 315 and the odd dynamic module 335 have similar designs. The even dynamic module 315 includes an upper domino circuit 315a, a lower domino circuit 315b, and a storage circuit 315c. The odd dynamic module 335 includes an upper domino circuit 335a, a lower domino circuit 335b, and a storage circuit 335c. The operations of the components in the speculative DFE 3 are summarized in Table 1.

TABLE 1

| duration | even speculative path 31 | odd speculative path 33 |
|---|---|---|
| evaluation period $T_{eva}$ | 1. even dynamic module 315 receives $D_{out\_odd}$ from odd speculative path 33<br>2. summers 311a, 311b receive $D_{in}$ and tap1, and respectively generate ($D_{in}$ − tap1), ($D_{in}$ + tap1)<br>3. sense amplifier 313a generates (APevn, ANevn), and sense amplifier 313b generates (BPevn, BNevn)<br>4. according to $D_{out\_odd}$, even dynamic module 315 selects one of (APevn, ANevn) and (BPevn, BNevn) as MXOPevn, MXONevn | 1. odd dynamic module 335 receives $D_{out\_evn}$ from even speculative path 31<br>2. summers 331a, 331b receive $D_{in}$ and tap1, and respectively generate ($D_{in}$ − tap1), ($D_{in}$ + tap1)<br>3. sense amplifier 333a generates (APodd, ANodd), and sense amplifier 333b generates (BPodd, BNodd)<br>4. according to $D_{out\_evn}$, odd dynamic module 335 selects one of (APodd, ANodd) and (BPodd, BNodd) as MXOPodd, MXONodd |

TABLE 1-continued

| duration | even speculative path 31 | odd speculative path 33 |
|---|---|---|
| precharge period $T_{pre}$ | 1. storage circuit 315c holds MXOPevn, MXONevn 2. inverters 317a, 317b convert MXOPevn, MXONevn to $D_{out\_evn}$ | 1. storage circuit 335c holds MXOPodd, MXONodd 2. inverters 337a, 337b convert MXOPodd, MXONodd to $D_{out\_odd}$ |

Table 1 shows that the operations of the components in the even speculative path 31 and the odd speculative path 33 are similar and symmetric, so the even dynamic module 315 and the odd dynamic module 335 have identical implementations. The even dynamic module 315 and the odd dynamic module 335 are different in terms of the origins of their input signals, and their multiplexer outputs are utilized interchangeably.

In FIG. 5B, the even dynamic module 315 integrates the functions provided by the latches 215a, 215b, and the multiplexer 217, and the odd dynamic module 335 integrates the functions provided by the latches 235a, 235b, and the multiplexer 237. The even dynamic module 315 and the odd dynamic module 335 are designed with dynamic logic, and they can efficiently proceed the latch and multiplexing operations.

Figure 6:
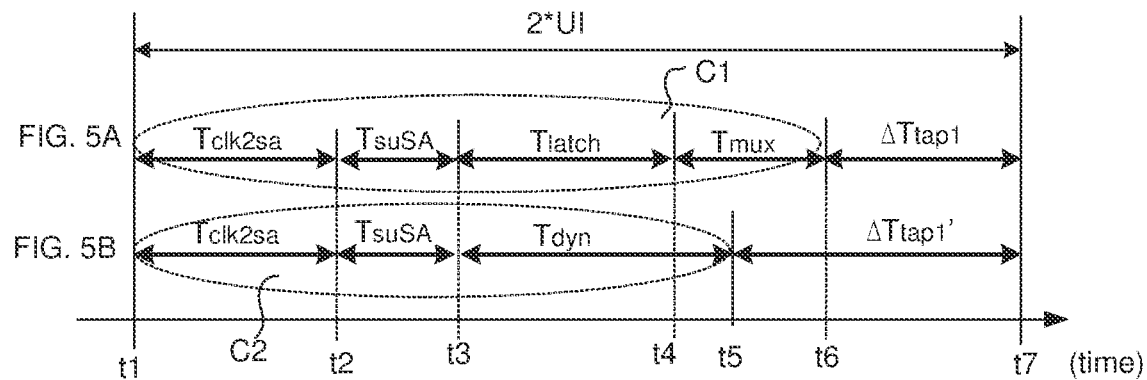
FIG. 6 is a schematic diagram comparing the delay contributors of the speculative DFEs in FIGS. 5A and 5B.

FIG. 6 is a schematic diagram comparing the delay contributors of the speculative DFEs in FIGS. 5A and 5B. The horizontal axis in FIG. 6 represents time. The duration between time point t1 and time point t7 is equivalent to the timing limit for the speculative first-tap (tap1), that is, two data unit intervals (2*UI). The upper part of FIG. 6 shows the delay contributors of the speculative DFE 2, and the lower part of FIG. 6 shows the delay contributors of the speculative DFE 3.

The delay contributors of the speculative DFE 2 includes the clock propagation delay $T_{clk2sa}$ of the sense amplifiers 213a, 213b (time point t1 and time point t2), the setup time $T_{suSA}$ of the sense amplifiers 213a, 213b (between time point t2 and time point t3), the propagation delay $T_{latch}$ of the latches 215a, 215b (between time point t3 and time point t4), and the propagation delay $T_{mux}$ of the multiplexer 217 (between time point t4 and time point t6). The difference between the two data unit intervals (2*UI) and the summation of the delay contributors of the speculative DFE 2, that is, the duration between time point t6 and time point t7, is the operating margin $\Delta T_{tap1}$ for the first-tap (tap1) when the speculative DFE 2 is adopted.

The delay contributors of the speculative DFE 3 includes the clock propagation delay $T_{clk2sa}$ of the sense amplifiers 313a, 313b (time point t1 and time point t2), the setup time $T_{suSA}$ of the sense amplifiers 313a, 313b (between time point t2 and time point t3), and the propagation delay $T_{dyn}$ of the even/odd dynamic module 315, 335 (between time point t3 and time point t5). The difference between the two data unit intervals (2*UI) and the summation of the delay contributors of the speculative DFE 3, that is, the duration between time point t5 and time point t7, is the operating margin $\Delta T_{tap1}$ for the speculative first-tap (tap1) when the speculative DFE 3 is adopted.

The dotted circle C1 represents the total propagation delay along the even/odd speculative path in FIG. 5A. The dotted circle C2 represents the total propagation delay along the even/odd speculative path in FIG. 5B. Please compare the dotted circles C1, C2 together. The duration circulated by the dotted circle C1 is longer than the duration circulated by the dotted circle C2, and the operating margin $\Delta T_{tap1}$ for the speculative first-tap (tap1) in FIG. 5B is longer than the operating margin $\Delta T_{tap1}$ in FIG. 5A. Therefore, the speculative DFE 3 in FIG. 5B could provide better tolerance for the speculative first-tap (tap1).

Figure 7:
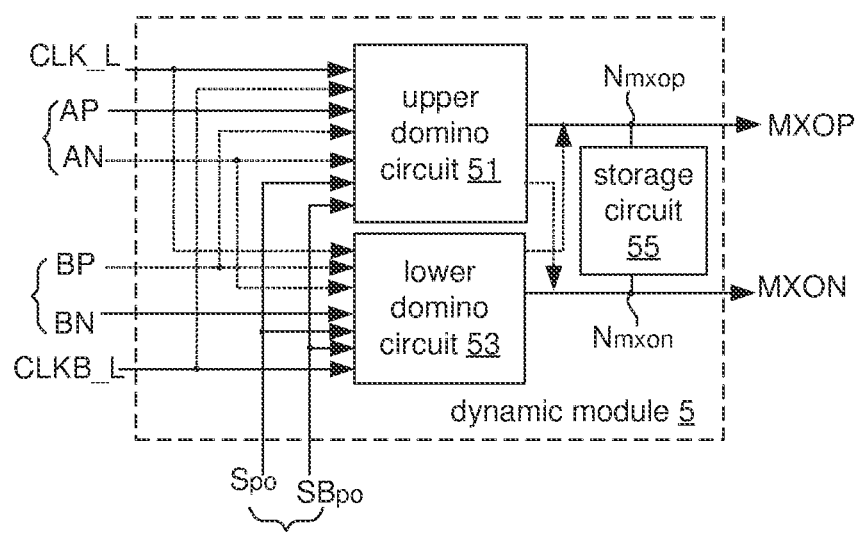
FIG. 7 is a generic block diagram of the dynamic module according to the concept of the present disclosure.

FIG. 7 is a generic block diagram of the dynamic module according to the concept of the present disclosure. The dynamic module 5 includes an upper domino circuit 51, a lower domino circuit 53, and a storage circuit 55. The dynamic module 5 can represent any of the even dynamic module 315 and the odd dynamic module 335 in FIG. 5B. The mapping of the signals in FIGS. 5B and 7 are listed in Table 2.

TABLE 2

| types of signals | signals | | FIG. 7 dynamic module 5 | FIG. 5B | |
|---|---|---|---|---|---|
| | | | | even dynamic module 315 | odd dynamic module 335 |
| input signals | latch clock signals | non-inverted latch clock signal | CLK_L | CLK_L (even) | CLK_L (odd) |
| | | inverted latch clock signal | CLKB_L | CLKB_L (even) | CLKB_L (odd) |
| | rail outputs | first positive rail-output | AP | APevn | APodd |
| | | first negative rail-output | AN | ANevn | ANodd |
| | | second positive rail-output | BP | BPevn | BPodd |
| | | second negative rail-output | BN | BNevn | BNodd |
| | previous decision bits | non-inverted previous decision bit | $S_{po}$ | $S_{evn}$ | $S_{odd}$ |
| | | inverted previous decision bit | $SB_{po}$ | $SB_{evn}$ | $SB_{odd}$ |
| output signals | multiplexer output | non-inverted multiplexer output | MXOP | MXOPevn | MXOPodd |
| | | inverted multiplexer output | MXON | MXONevn | MXONodd |

The upper domino circuit 51 and the lower domino circuit 53 receive three types of input signals, including the non-inverted/inverted latch clock signals (CLK_L, CLKB_L), the first rail-to-rail output pair (AP, AN), the second rail-to-rail output pair (BP, BN), and the previous decision bits ($S_{po}$, $SB_{po}$). The non-inverted previous decision bit $S_{po}$ and the inverted previous decision bit $SB_{po}$ are received from another dynamic module, and the non-inverted latch clock signal CLK_L and the inverted latch clock signal CLKB_L are received from other circuits (for example, a PLL) of the system.

Being electrically connected between the non-inverted multiplexer output terminal $N_{mxop}$ and the inverted multiplexer output terminal $N_{mxon}$, the storage circuit 55 bridges the upper domino circuit 51 and the lower domino circuit 53. The non-inverted multiplexer output MXOP is generated at the non-inverted multiplexer output terminal $N_{mxop}$, and the inverted multiplexer output MXON is generated at the inverted multiplexer output terminal $N_{mxon}$.

To represent the signal states, some symbols are utilized in the specification. In the specification, the symbol "X"

represents changes of the signal do not affect the circuit's operation, and the symbol "Z" represents the signal is floating (high impedance).

According to the embodiments of the present disclosure, the dynamic module 5 operates in a dual-phase manner. In the evaluation period $T_{eva}$, the non-inverted multiplexer output MXOP and the inverted multiplexer output MXON are selectively updated with one of the first rail-to-rail output pair (AP, AN) and the second rail-to-rail output pair (BP, BN), depending on the non-inverted previous decision bit $S_{po}$ and the inverted previous bit $SB_{po}$. In the precharge period $T_{pre}$, the non-inverted multiplexer output MXOP and the inverted multiplexer output MXON are not updated but maintained.

In the disclosure, three embodiments using the dynamic module 5 are demonstrated. The first embodiment is shown in FIGS. 8A, 8B, 9, 10A, 10B, 11, and 12. The second embodiment is shown in FIGS. 13A, 13B, 14, 15A, 15B, 16, 17, and 18. The third embodiment is shown in FIGS. 19A, 19B, 20, 21A, 21B, 22 and 23. In these embodiments, the block diagrams, the circuit designs, summary tables of signal states are presented, and operations of the dynamic modules based on these embodiments are described. It should be noted that implementations based on the concept of the present disclosure should not be limited to the following embodiments.

First Embodiment

Figure 8A:
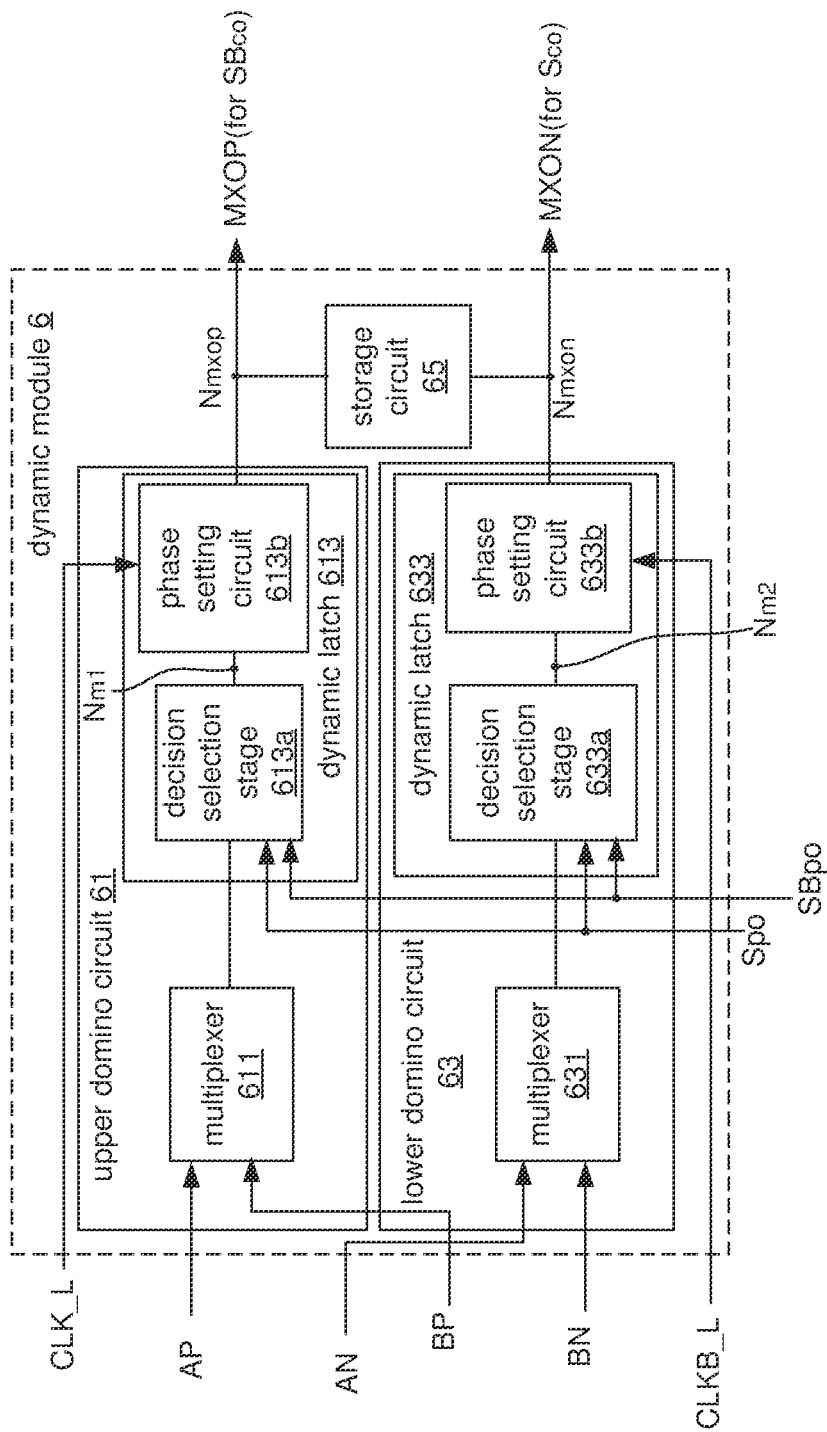
FIG. 8A is a block diagram illustrating the dynamic module according to the first embodiment of the present disclosure.
Figure 8B:
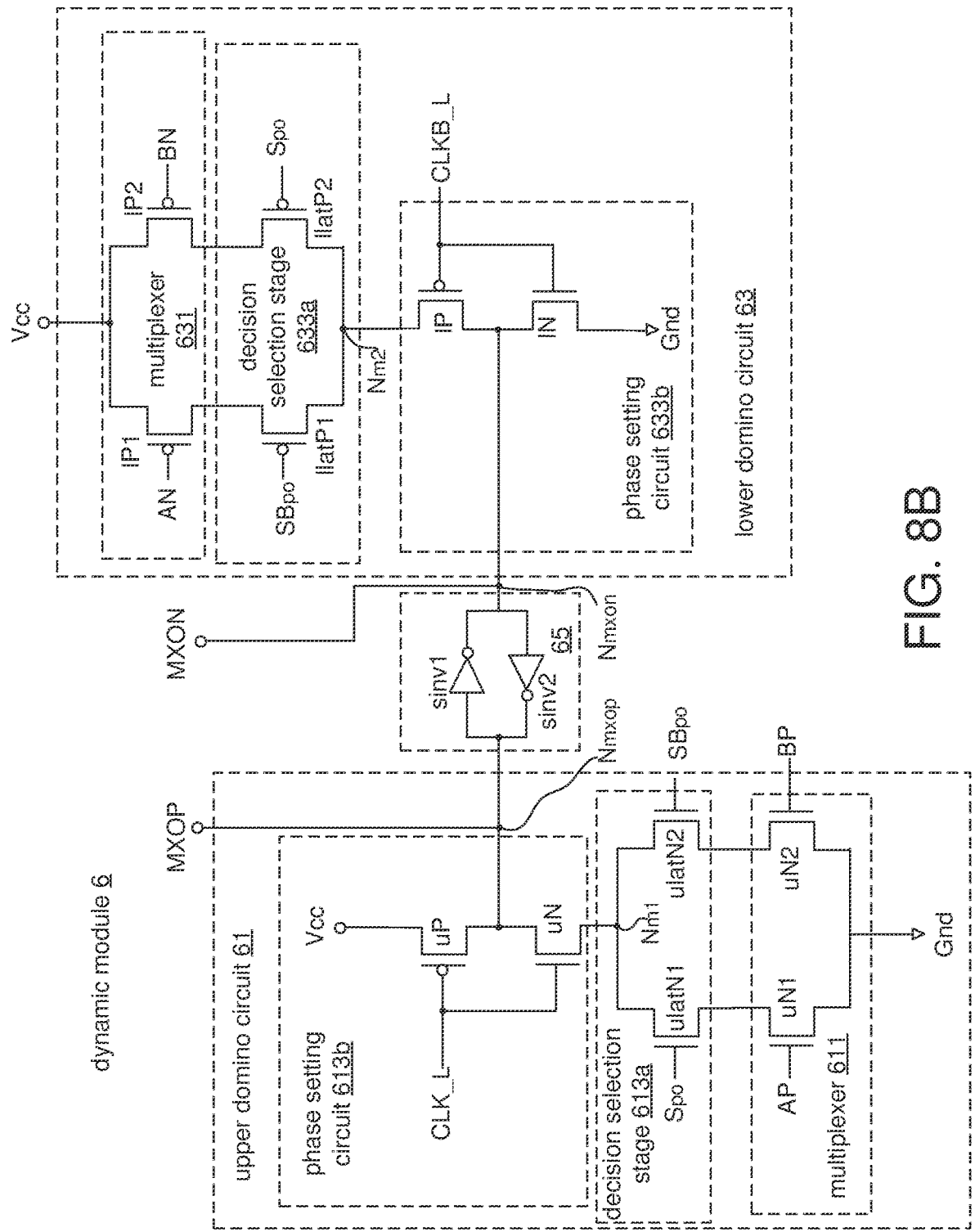
FIG. 8B is a schematic diagram illustrating the circuit design of the dynamic module according to the first embodiment of the present disclosure.
Figure 9:
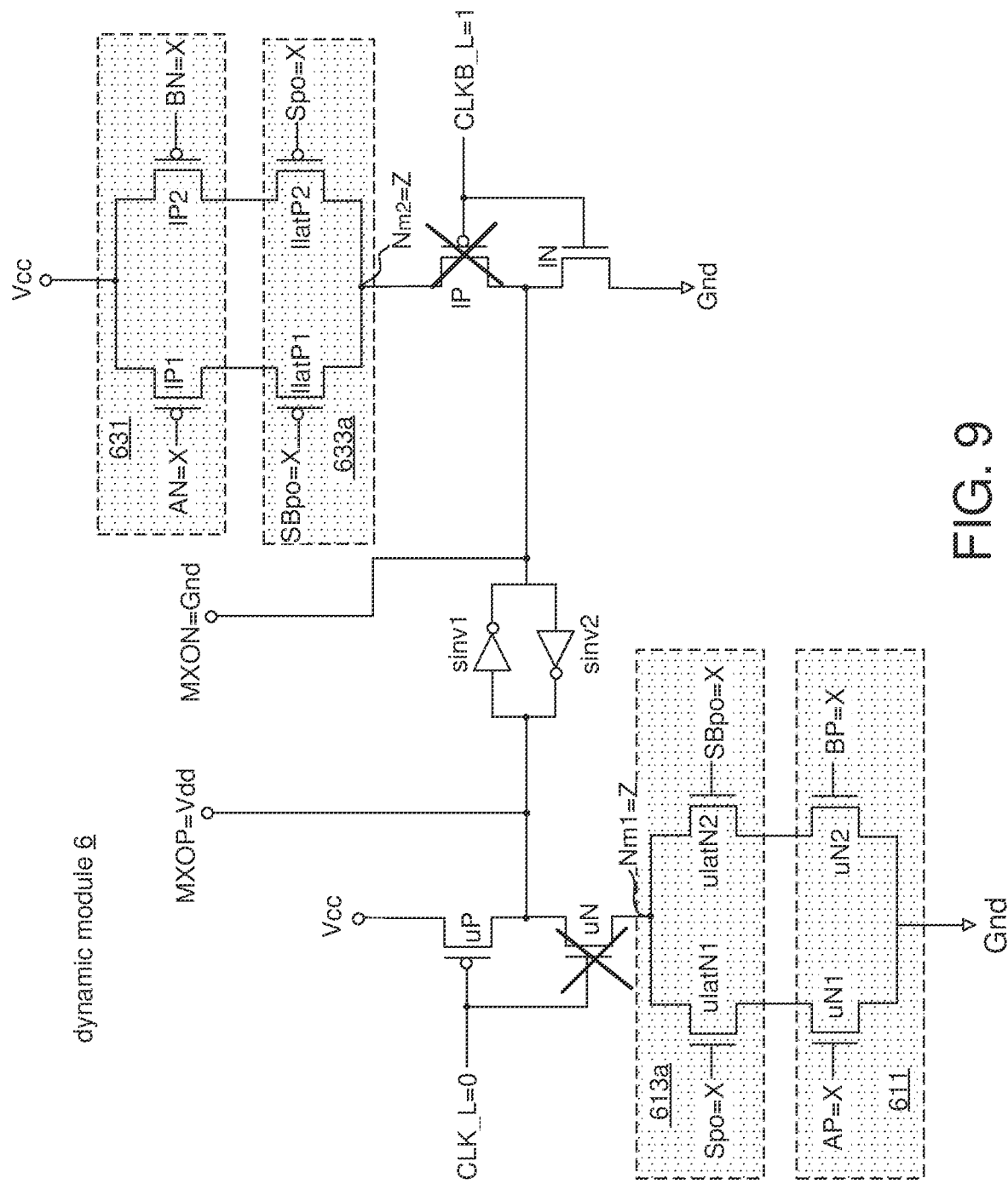
FIG. 9 is a schematic diagram illustrating how the dynamic module, according to the first embodiment of the present disclosure, operates in the precharge period $T_{pre}$.
Figure 10A:
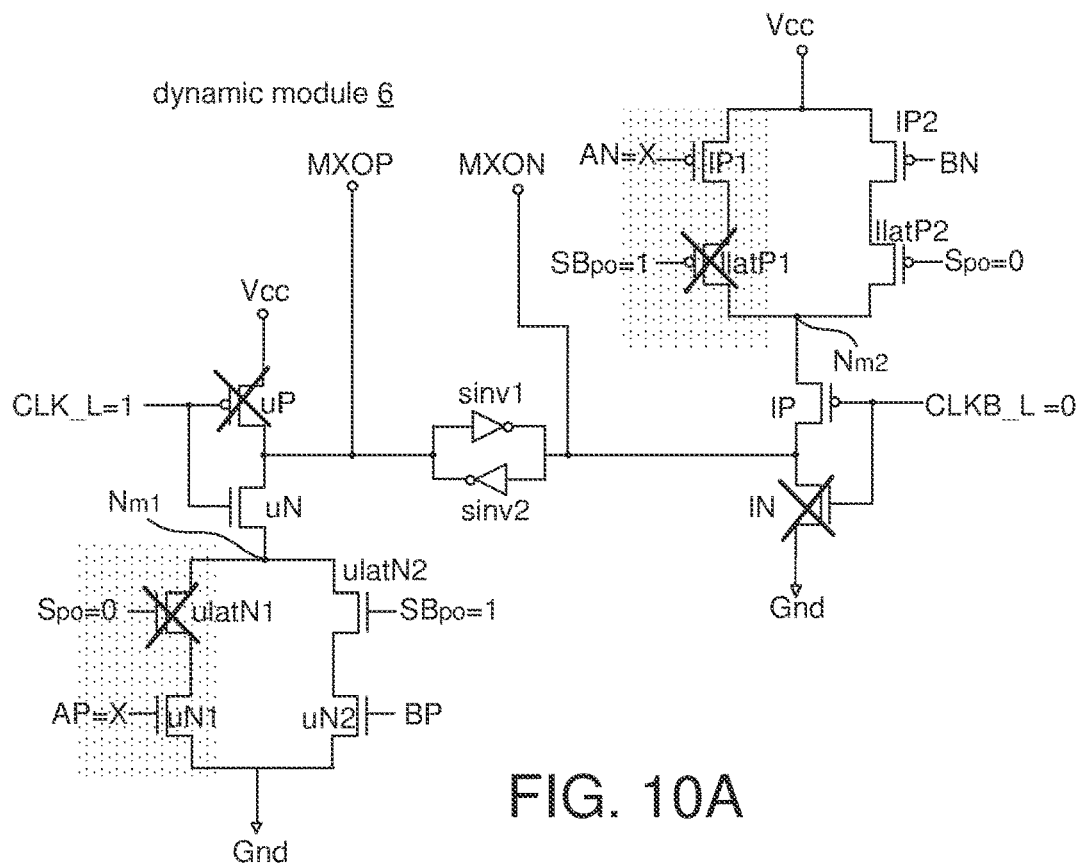
FIG. 10A is a schematic diagram illustrating how the dynamic module, according to the first embodiment of the present disclosure, operates in the evaluation period $T_{eva}$ when the non-inverted previous decision bit $S_{po}$ is in logic low ($S_{po}$=0) and the inverted previous decision bit $SB_{po}$ is in logic high ($SB_{po}$=1).
Figure 10B:
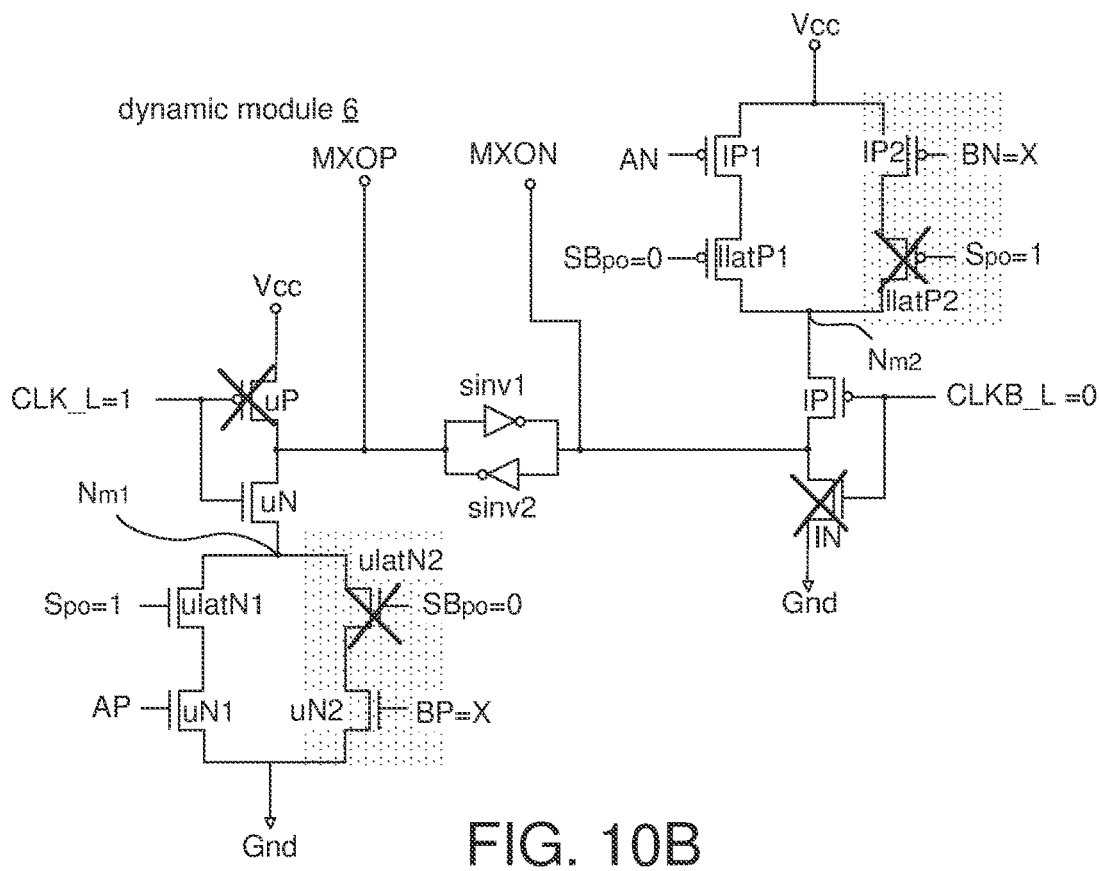
FIG. 10B is a schematic diagram illustrating how the dynamic module, according to the first embodiment of the present disclosure, operates in the evaluation period $T_{eva}$ when the non-inverted previous decision bit $S_{po}$ is in logic high ($S_{po}$=1) and the inverted previous decision bit $SB_{po}$ is in logic low ($SB_{po}$=0).
Figure 12:
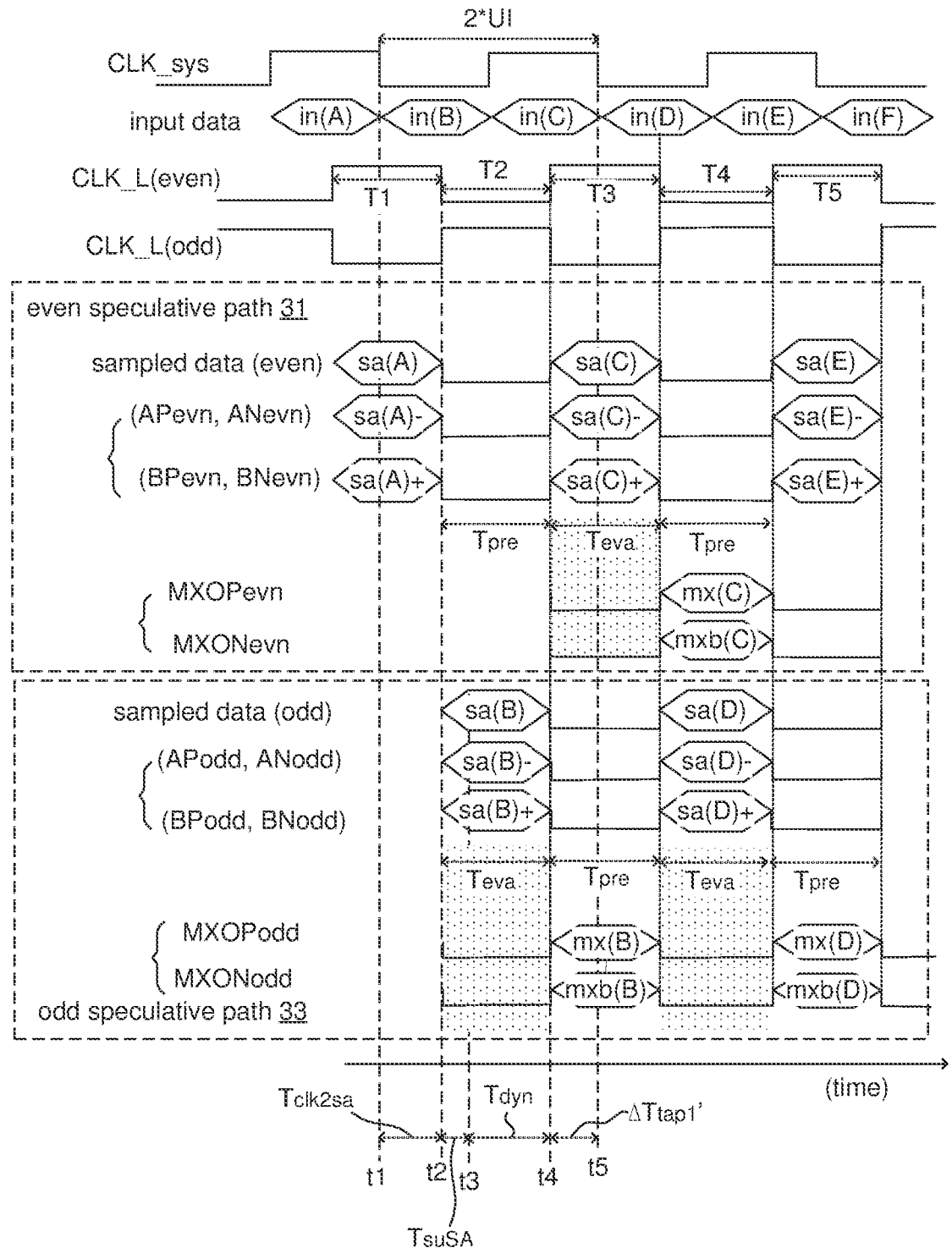
FIG. 12 is a waveform diagram illustrating that an exemplary data stream is processed by the speculative DFE according to the first embodiment of the present disclosure.

The block diagram and the circuit design of the dynamic module 6, according to the first embodiment of the present disclosure, are shown in FIGS. 8A and 8B, respectively. The operations of the dynamic module 6 in the precharge period $T_{pre}$ are illustrated in FIG. 9, and the operations of the dynamic module 6 in the evaluation period $T_{eva}$ are illustrated in FIGS. 10A and 10B. FIG. 11 lists the states of the signals of the dynamic module 6 in the precharge period $T_{pre}$ and the evaluation period $T_{eva}$. FIG. 12 shows how the dynamic module 6 is applied to the speculative DFE 3.

FIG. 8A is a block diagram illustrating the dynamic module according to the first embodiment of the present disclosure. The dynamic module 6 includes an upper domino circuit 61, a lower domino circuit 63, and a storage circuit 65. The storage circuit 65 is electrically connected to the upper domino circuit 61 through the non-inverted multiplexer terminal $N_{mxop}$, and the storage circuit 65 is electrically connected to the lower domino circuit 63 through the inverted multiplexer terminal $N_{mxon}$.

The upper domino circuit 61 further includes a multiplexer 611 and a dynamic lath 613, and the lower domino circuit 63 further includes a multiplexer 631 and a dynamic latch 633. The dynamic latch 613 includes a decision selection stage 613a and a phase setting circuit 613b, and the dynamic latch 633 includes a decision selection stage 633a and a phase setting circuit 633b.

FIG. 8B is a schematic diagram illustrating the circuit design of the dynamic module according to the first embodiment of the present disclosure. In the upper domino circuit 61, the multiplexer 611 includes NMOS transistors uN1, uN2, the decision selection stage 613a includes NMOS transistors ulatN1, ulatN2, and the phase setting circuit 613b includes a PMOS transistor uP and an NMOS transistor uN. In the lower domino circuit 63, the multiplexer 631 includes PMOS transistors lP1, lP2, the decision selection stage 633a includes PMOS transistors llatP1, llatP2, and the phase setting circuit 633b includes a PMOS transistor lP and an NMOS transistor lN. The storage circuit 65 includes inverters sinv1, sinv2.

The signals and connections related to the multiplexer 611, the decision selection stage 613a, and the phase setting circuit 613b in the upper domino circuit 61 are respectively illustrated. In the multiplexer 611, the drain terminals of the NMOS transistors uN1, uN2 are electrically connected to the decision selection stage 613a. The source terminals of the NMOS transistors uN1, uN2 are electrically connected to the ground terminal (Gnd). The gate terminal of the NMOS transistor uN1 receives the first positive rail-output AP, and the gate terminal of the NMOS transistor uN2 receives the second positive rail-output BP.

In the decision selection stage 613a, the drain terminals of the NMOS transistors ulatN1, ulatN2 are electrically connected to the middle terminal $N_{m1}$, and the source terminals of the NMOS transistors ulatN1, ulatN2 are respectively electrically connected to the drain terminals of the NMOS transistor uN1, uN2 in the multiplexer 611. The gate terminal of the NMOS transistor ulatN1 receives the non-inverted previous decision bit $S_{po}$, and the gate terminal of the NMOS transistor ulatN2 receives the inverted previous decision bit $SB_{po}$.

In the phase setting circuit 613b, the source terminal of the PMOS transistor uP is electrically connected to a supply voltage terminal (Vcc), and the source terminal of the NMOS transistor uN is electrically connected to the middle terminal $N_{m1}$. The gate terminals of the PMOS transistor uP and the NMOS transistor uN are electrically connected together for receiving the non-inverted latch clock signal CLK_L. Both the drain terminals of the PMOS transistor uP and the NMOS transistor uN are electrically connected to the non-inverted multiplexer output terminal $N_{mxop}$.

The signals and connections related to the multiplexer 631, the decision selection stage 633a, and the phase setting circuit 633b in the lower domino circuit 63 are respectively illustrated. In the multiplexer 631, the drain terminals of the PMOS transistors lP1, lP2 are electrically connected to the decision selection stage 633a. The source terminals of the PMOS transistors lP1, lP2 are electrically connected to the supply voltage terminal (Vcc). The gate terminal of the PMOS transistor lP1 receives the first negative rail-output AN, and the gate terminal of the PMOS transistor lP2 receives the second negative rail-output BN.

In the decision selection stage 633a, the drain terminals of the PMOS transistors llatP1, llatP2 are electrically connected to the middle terminal $N_{m2}$, and the source terminals of the PMOS transistors llatP1, llatP2 are respectively electrically connected to the drain terminals of the PMOS transistor lP1, lP2. The gate terminal of the PMOS transistor llatP1 receives the inverted previous decision bit $SB_{po}$, and the gate terminal of the PMOS transistor llatP2 receives the non-inverted previous decision bit $S_{po}$.

In the phase setting circuit 633b, the source terminal of the NMOS transistor lN is electrically connected to the ground terminal (Gnd), and the source terminal of the PMOS transistor lP is electrically connected to the middle terminal $N_{m2}$. The gate terminals of the PMOS transistor lP and the NMOS transistor lN are electrically connected together for receiving the inverted latch clock signal CKB_L. Both the drain terminals of the PMOS transistor lP and the NMOS transistor lN are electrically connected to the inverted multiplexer output terminal $N_{mxon}$.

In the storage circuit 65, the input terminal and the output terminal of the inverter sinv1 are respectively electrically connected to the non-inverted multiplexer output terminal $N_{mxop}$ and the inverted multiplexer output terminal $N_{mxon}$. The input terminal and the output terminal of the inverter sinv2 are respectively electrically connected to the inverted multiplexer output terminal $N_{mxon}$ and the non-inverted multiplexer output terminal $N_{mxop}$.

FIG. 9 is a schematic diagram illustrating how the dynamic module, according to the first embodiment of the present disclosure, operates in the precharge period $T_{pre}$. The operations the upper domino circuit 61 and the lower domino circuit 63 are respectively illustrated.

The operations of the components in the upper domino circuit 61 in the precharge period $T_{pre}$ are illustrated. In the phase setting circuit 613b, the PMOS transistor uP and the NMOS transistor uN are respectively turned on and turned off. Therefore, the non-inverted multiplexer output MXOP is equivalent to the supply voltage Vcc (MXOP=1), and the decision selection stage 613a and the multiplexer 611 are isolated from the non-inverted multiplexer output terminal $N_{mxop}$. Consequentially, the non-inverted multiplexer output MXOP is irrelevant to the inputs of the upper domino circuit 61, that is, the first positive rail-output AP and the second positive rail-output BP. The multiplexer 611 and the decision selection stages 613a are shown with dotted screen tone to represent that they are disabled.

The operations of the components in the lower domino circuit 63 in the precharge period $T_{pre}$ are described. In the phase setting circuit 633b, the PMOS transistor lP and the NMOS transistor lN are respectively turned off and turned on. Therefore, the inverted multiplexer output MXON is equivalent to the ground voltage Gnd (MXON=0), and the decision selection stage 633a and the multiplexer 631 are isolated from the inverted multiplexer output terminal $N_{mxon}$. Consequentially, the inverted multiplexer output MXON is irrelevant to the inputs of the lower domino circuit 63, that is, the first negative rail-output AN and the second negative rail-output BN. The multiplexer 631 and the decision selection stages 633a are shown with dotted screen tone to represent that they are disabled.

FIGS. 10A and 10B demonstrate the signal and component states of the dynamic module 6 when the dynamic module 6 operates in the evaluation period $T_{eva}$. In dynamic module 6, the PMOS transistors and the NMOS transistors in the decision selection stages 613a, 633a and the multiplexers 611, 631 can be classified into four branches, in accordance with their positions and connections. The four branches include a lower-left branch (NMOS transistors ulatN1, uN1), a lower-right branch (NMOS transistors ulatN2, uN2), an upper-left branch (PMOS transistors lP1, llatP1), and an upper-right branch (PMOS transistors lP2, llatP2).

FIG. 10A is a schematic diagram illustrating how the dynamic module according to the first embodiment of the present disclosure operates in the evaluation period $T_{eva}$ when the non-inverted previous decision bit $S_{po}$ is in logic low ($S_{po}$=0) and the inverted previous decision bit $SB_{po}$ is in logic high ($SB_{po}$=1). FIG. 10B is a schematic diagram illustrating how the dynamic module, according to the first embodiment of the present disclosure, operates in the evaluation period $T_{eva}$ when the non-inverted previous decision bit $S_{po}$ is in logic high ($S_{po}$=1) and the inverted previous decision bit $SB_{po}$ is in logic low ($SB_{po}$=0).

In FIGS. 10A and 10B, the non-inverted multiplexer output MXOP and the inverted multiplexer output MXON may remain unchanged or be updated with one of the first rail-to-rail output pair (AP, AN) and the second rail-to-rail output pair (BP, BN), depending on the non-inverted previous decision bit $S_{po}$ and the inverted previous decision bit $SB_{po}$.

The operations of the phase setting circuit 613b, the decision selection stage 613a, and the multiplexer 611 in the upper domino circuit 61 in the evaluation period $T_{eva}$ are described. As the non-inverted latch clock signal CLK_L is in logic high (CLK_L=1), the PMOS transistor uP and the NMOS transistor uN in the phase setting circuit 613b are respectively turned off and turned on, and the non-inverted multiplexer output MXOP is determined by the decision selection stage 613a and the multiplexer 611.

When the non-inverted previous decision bit Sp is in logic low ($S_{po}$=0), and the inverted previous decision bit $SB_{po}$ is in logic high ($SB_{po}$=1) (see FIG. 10A), the NMOS transistor ulatN1 and the NMOS transistor ulatN2 in the decision selection stage 613a are respectively turned off and turned on. Consequentially, the NMOS transistor uN1 in the multiplexer 611 is turned off because the NMOS transistor ulatN1 in the decision selection stage 613a is turned off, and the NMOS transistor uN2 in the multiplexer 611 might be turned on or turned off, depending on the second positive rail-output BP. In FIG. 10A, the NMOS transistors ulatN1, uN1 in the lower-left branch are shown in dotted screen tone to represent that they are irrelevant to the non-inverted multiplexer output MXOP.

In FIG. 10A, the NMOS transistor uN2 in the multiplexer 611 might be turned on or turned off, depending on the second positive rail-output BP. If the second positive rail-output BP is in logic low (BP=0), the NMOS transistor uN2 in the multiplexer 611 is turned off, and the non-inverted multiplexer output MXOP is not updated. If the second positive rail-output BP is in logic high (BP=1), the NMOS transistor uN2 is turned on, and the non-inverted multiplexer output MXOP is equivalent to the ground voltage Gnd (MXOP=0). In short, the non-inverted multiplexer output MXOP in FIG. 10A is determined by the lower-right branch.

When the non-inverted previous decision bit $S_{po}$ is in logic high ($S_{po}$=1), and the inverted previous decision bit $SB_{po}$ is in logic low ($SB_{po}$=0) (see FIG. 10B), the NMOS transistor ulatN1 and the NMOS transistor ulatN2 in the decision selection stage 613a are respectively turned on and turned off. Consequentially, the NMOS transistor uN1 in the multiplexer 611 might be turned on or turned off, depending on the first positive rail-output AP, and the NMOS transistor uN2 in the multiplexer 631 is turned off because the NMOS transistor ulatN2 in the decision selection stage 613a is turned off. In FIG. 10B, the NMOS transistors ulatN2, uN2 in the lower-right branch are shown in dotted screen tone to represent that they are irrelevant to the non-inverted multiplexer output MXOP.

In FIG. 10B, the NMOS transistor uN1 in the multiplexer 611 might be turned on or turned off, depending on the first positive rail-output AP. If the first positive rail-output AP is in logic low (AP=0), the NMOS transistor uN1 in the multiplexer 611 is turned off, and the non-inverted multiplexer output MXOP is not updated. If the first positive rail-output AP is in logic high (AP=1), the NMOS transistor uN1 in the multiplexer 611 is turned on, and the non-inverted multiplexer output MXOP is equivalent to the ground voltage Gnd (MXOP=0). In short, the non-inverted multiplexer output MXOP in FIG. 10B is determined by the lower-left branch.

When the dynamic module 6 operates in the evaluation period $T_{eva}$, the phase setting circuit 613b, the decision selection stage 613a, and the multiplexer 611 in the upper domino circuit 61 operate in sequential order. The phase setting circuit 613b firstly determines whether the non-inverted multiplexer output MXOP is related to the decision selection stage 613a and the multiplexer 611. Then, the decision selection stage 613a determines which of the NMOS transistors uN1, uN2 in the multiplexer 611 would affect the non-inverted multiplexer output MXOP.

The operations of the phase setting circuit 633b, the decision selection stage 633a, and the multiplexer 631 in the lower domino circuit 63 in the evaluation period $T_{eva}$ are symmetric to those in the upper domino circuit 61. As the inverted latch clock signal CLKB_L is in logic low (CLKB_L=0), the PMOS transistor IP and the NMOS transistor lN in the phase setting circuit 633b are respectively turned on and turned off, and the inverted multiplexer output MXON is determined by the decision selection stage 633a and the multiplexer 631.

When the non-inverted previous decision bit $S_{po}$ is in logic low ($S_{po}$=0), and the inverted previous decision bit $SB_{po}$ is in logic high ($SB_{po}$=1) (see FIG. 10A), the PMOS transistors llatP1 and llatP2 are respectively turned off and turned on, and the inverted multiplexer output MXON is determined by the upper-right branch. In FIG. 10A, the PMOS transistors llatP1, lP1 in the upper-left branch are shown in dotted screen tone to represent that they are irrelevant to the inverted multiplexer output MXON.

Alternatively, when the non-inverted previous decision bit $S_{po}$ is in logic high ($S_{po}$=1), and the inverted previous decision bit $SB_{po}$ is in logic low ($SB_{po}$=0) (see FIG. 10B), the PMOS transistors llatP1 and llatP2 are respectively turned on and turned off, and the inverted multiplexer output MXON is determined by the upper-left branch. In FIG. 10B, the PMOS transistors llatP2, lP2 in the upper-right branch are shown in dotted screen tone to represent that they are irrelevant to the inverted multiplexer output MXON.

When the dynamic module 6 operates in the evaluation period $T_{eva}$, the phase setting circuit 633b, the decision selection stage 633a, and the multiplexer 631 in the lower domino circuit 63 operate in sequential order. The phase setting circuit 633b firstly determines whether the inverted multiplexer output MXON is related to the decision selection stage 633a and the multiplexer 631. Then, the decision selection stage 633a determines which of the PMOS transistors lP1, lP2 in the multiplexer 631 would affect the inverted multiplexer output MXON.

Details about how the dynamic module 6 operates in response to different input signals have been illustrated above. For the sake of comparison, FIG. 11 lists different combinations of the input signals of the dynamic module 6, and their corresponding non-inverted multiplexer output MXOP and inverted multiplexer output MXON.

FIG. 11 is a summary table listing signal states of the dynamic module in the precharge period $T_{pre}$ and in the evaluation period $T_{eva}$ according to the first embodiment of the present disclosure. The signal states of the dynamic module 6 in the precharge period $T_{pre}$ are summarized based on the illustrations of FIG. 9. The signal states of the dynamic module 6 in the evaluation period $T_{eva}$ are summarized based on the illustrations of FIGS. 10A and 10B.

In the precharge period $T_{pre}$, the first rail-to-rail output pair (AP, AN) and the second rail-to-rail output pair (BP, BN) are irrelevant to the non-inverted multiplexer output MXOP and the inverted multiplexer output MXON because the non-inverted latch clock signal CLK_K is in logic low (CLK_L=0), and the inverted latch clock signal CLKB_L is in logic high (CLKB_L=1). Accordingly, the non-inverted multiplexer output MXOP and the inverted multiplexer output MXON are held by the storage circuit 65.

In the evaluation period $T_{eva}$, when the non-inverted previous decision bit $S_{po}$ is in logic low ($S_{po}$=0) and the inverted previous decision bit $SB_{po}$ is in logic high ($SB_{po}$=1), the non-inverted multiplexer output MXOP and the inverted multiplexer output MXON are selectively updated with the second rail-to-rail output pair (BP, BN). On the other hand, in the evaluation period $T_{eva}$, when the non-inverted previous decision bit Sp is in logic high ($S_{po}$=1) and the inverted previous decision bit $SB_{po}$ is in logic low ($SB_{po}$=0), the non-inverted multiplexer output MXOP and the inverted multiplexer output MXON are selectively updated with the first rail-to-rail output pair (AP, AN).

As illustrated in FIG. 3, the speculative DFE 15 operates in a recursive manner, and the even speculative path 31 and the odd speculative path 33 influence each other. To clarify how to apply the dynamic module 6 to the speculative DFE 3 in FIG. 5B, a waveform for illustrating signal relationships when the speculative DFE 3 adopts the dynamic module 6, is presented.

FIG. 12 is a waveform diagram illustrating that an exemplary data stream is processed by the DFE according to the first embodiment of the present disclosure. At the top of FIG. 12, the waveforms of the system clock signal CLK_sys, the input data in(A)~in(F), the even-path non-inverted latch clock signal CLK_L(even) and the odd-path non-inverted latch clock signal CLK_L(odd) are shown.

The system clock signal CLK_sys and the input data in(A)~in(F) are simultaneously received by both the even dynamic module 315 and the odd dynamic module 335. The even dynamic module 315 receives the even-path non-inverted latch clock signal CLK_L(even), and the odd dynamic module 335 receives the odd-path non-inverted latch clock signal CLK_L(odd). The system clock signal CLK_sys might originate from a phase-locked loop (hereinafter, PLL).

In the specification, it is assumed that the duration, when the even-path non-inverted latch clock signal CLK_L(even) is in logic high (CLK_L(even)=1), the sense amplifiers 313a, 313b in the even speculative path 31 perform sample and hold operation, and the sense amplifiers 333a, 333b in the odd speculative path 33 suspend their operations. Moreover, it is assumed that the duration, when the odd-path non-inverted latch clock signal CLK_L(odd) is in logic high (CLK_L(odd)=1), the sense amplifiers 333a, 333b in the odd speculative path 33 perform sample and hold operation, and the sense amplifiers 313a, 313b in the even speculative path 33 suspend their operations. Whereas, in practical application, the sense amplifiers 313a, 313b, 333a, 333b and the logic levels of their corresponding latch clock signals are not limited to the descriptions here.

FIG. 12 shows two dotted rectangles. The waveforms in the upper dotted rectangle represent the signals related to the even speculative path 31, and the waveforms in the lower dotted rectangle represent the signals related to the odd speculative path 33.

In FIG. 12, the input data in(A)~in(F) change at the rising and the falling edges of the system clock signal CLK_sys. These input data in(A)~in(F) are alternately processed by the even speculative path 31 and the odd speculative path 33. In response to the trigger of the even-path non-inverted latch clock signal CLK_L(even), the even speculative path 31 processes the input data in(A), in(C), in(E). In response to the trigger of the odd-path non-inverted latch clock signal CLK_L(odd), the odd speculative path 33 processes the input data in(B), in(D), in(F).

Due to the clock propagation delay $T_{clk2sa}$, the rising edges of the even-path non-inverted latch clock signal CLK_L(even) are slightly behind the rising edges of the system clock signal CLK_sys, and the falling edges of the odd-path non-inverted latch clock signal CLK_L(odd) are slightly behind the rising edges of the system clock signal CLK_sys.

In the even speculative path 31, the input data in(A), in(C), and in(E) are sampled by the sense amplifiers 313a, 313b to generate the sampled data sa(A), sa(C), sa(E) when the even-path non-inverted latch clock signal CLK_L(even) is in logic high (CLK_L(even)=1). When the even-path non-inverted latch clock signal CLK_L(even) is in logic low (CLK_L(even)=), the sense amplifiers 313a, 313b suspend their operations.

In the odd speculative path 33, the input data in(B), in(D) are sampled by the sense amplifiers 333a, 333b to generate the sampled data sa(B), sa(D) when the odd-path non-inverted latch clock signal CLK_L is in logic high (CLK_L (odd)=1). When the odd-path non-inverted latch clock signal CLK_L(odd) is in logic low (CLK_L(odd)=0), the sense amplifiers 333a, 333b suspend their operations.

For each sampled data sa(A)~(E), two rail-to-rail output pairs are generated. In the even speculative path 31, the two rail-to-rail output pairs include a first even-path rail-to-rail output pair (APevn, ANevn) and a second even-path rail-to-rail output pair (BPevn, BNevn). In the odd speculative path 33, the two rail-to-rail output pairs include a first odd-path rail-to-rail output pair (APodd, ANodd) and a second odd-path rail-to-rail output pair (BPodd, BNodd).

When the clock-level of the even-path non-inverted latch clock signal CLK_L(even) is equivalent to logic high (CLK_L(even)=1), in the even speculative path 31, the sense amplifier 313a generates the first even-path rail-to-rail output pair (APevn, ANevn) and the sense amplifier 313b generates the second even-path rail-to-rail output pair (BPevn, BNevn) based on the sampled data sa(A), sa(C), sa(E). In the durations T1, T3, and T5, the first even-path rail-to-rail output pairs (APevn, ANevn) as being output by the sense amplifier 313a are represented as sa(A)−, sa(C)−, sa(E)−, being respectively corresponding to the sampled data sa(A), sa(C), sa(E), and the second even-path rail-to-rail output pairs (BPevn, BNevn) as being output by the sense amplifier 313b are represented as sa(A)+, sa(C)+, sa(E)+, being respectively corresponding to the sampled data sa(A), sa(C), sa(E). Meanwhile, the clock-level of the odd-path non-inverted latch clock signal CLK_L(odd) is equivalent to logic low (CLK_L(odd)=0), and the sense amplifiers 331a, 331b in the odd speculative path 33 do not sample nor hold any of the input data.

When the clock-level of the odd-path non-inverted latch clock signal CLK_L(odd) is equivalent to logic high (CLK_L(odd)=1), the clock-level of the even-path non-inverted latch clock signal CLK_L(even) is equivalent to logic low (CLK_L(even)=0), and the sense amplifiers 311a, 311b in the even speculative path 31 do not sample nor hold any of the input data. Meanwhile, in the odd speculative path 33, the sense amplifier 333a generates the first odd-path rail-to-rail output pair (APodd, ANodd) and the sense amplifier 333b generates the second odd-path rail-to-rail output pair (BPodd, BNodd) based on the sampled data sa(B), sa(D). In the durations T2 and T4, the first odd-path rail-to-rail output pairs (APodd, ANodd) as being output by the sense amplifier 333a are represented as sa(B)−, sa(D)−, being respectively corresponding to the sampled data sa(B), sa(D), and the second odd-path rail-to-rail output pairs (BPodd, BNodd) as being output by the sense amplifier 333b are represented as sa(B)+, sa(D)+, being respectively corresponding to the sampled data sa(B), sa(D).

During the evaluation period $T_{eva}$ corresponding to the even speculative path 31, the even-path non-inverted multiplexer output MXOPevn and the even-path inverted multiplexer output MXONevn are generated by the even dynamic module 315. The even-path non-inverted multiplexer output MXOPevn corresponding to the sampled data sa(C), sa(E) are represented as mx(C), mx(E), and the even-path inverted multiplexer output MXONevn corresponding to the sampled data sa(C), sa(E) are represented as mxb(C), mxb(E).

During the evaluation period $T_{eva}$ corresponding to the odd speculative path 33, the odd-path non-inverted multiplexer output MXOPodd and the odd-path inverted multiplexer output MXONodd are generated by the odd dynamic module 335. The odd-path non-inverted multiplexer output MXOPodd corresponding to the sampled data sa(B), sa(D) are represented as mx(B), mx(D), and the odd-path inverted multiplexer output MXONodd corresponding to the sampled data sa(B), sa(D) are represented as mxb(B), mxb(D).

The processing procedure about some of the input data is illustrated. Please refer to FIGS. 5B, and 12 together. Firstly, in the even speculative path 31, the input data in(A) is sampled to generate the sampled data sa(A). As the input data in(A) is the first input data, the sampled data sa(A) is directly referred by the odd dynamic module 335 for selecting which of the first odd-path rail-to-rail output pair (APodd, ANodd) and the second odd-path rail-to-rail output pair (BPodd, BNodd) is corresponding to the sampled data sa(B).

In the odd speculative path 33, the input data in(B) is sampled to generate the sampled data sa(B). Then, the sense amplifier 333a generates the first odd-path rail-to-rail output pair sa(B)− and the sense amplifier 333b generates the second odd-path rail-to-rail output pair sa(B)+. After referring to the sampled data sa(A), the odd dynamic module 335 generates the odd-path non-inverted multiplexer output MXOPodd and the odd-path inverted multiplexer output MXONodd corresponding to the sampled data sa(B) (that is, mx(B), mxb(B)), by selecting one of the first odd-path rail-to-rail output pair sa(B)− and the second odd-path rail-to-rail output pair sa(B)+.

In the case that the odd dynamic module 335 selects the first odd-path rail-to-rail output pair sa(B)−, the odd-path non-inverted multiplexer output mx(B) is equivalent to the first odd-path positive rail-output APodd, and the odd-path inverted multiplexer output mxb(B) is equivalent to the first odd-path negative rail-output ANodd. In the case that the odd dynamic module 335 selects the second odd-path rail-to-rail output pair sa(B)+, the odd-path non-inverted multiplexer output mx(B) is equivalent to the second odd-path positive rail-output BPodd, and the inverted multiplexer output odd-path mxb(B) is equivalent to the second odd-path negative rail-output BNodd. The inverters 337a, 337b further converts the odd-path non-inverted multiplexer output mx(B) and the inverted multiplexer output odd-path mxb(B) to the odd-path decision $D_{out\_odd}$.

In the even speculative path 31, the input data in(C) is sampled to generate the sampled data sa(C). Then, the sense amplifier 313a generates the first even-path rail-to-rail output pair sa(C)− and the sense amplifier 313b generates the second even-path rail-to-rail output pair sa(C)+. After referring to the odd-path decision $D_{out\_odd}$, the even dynamic module 315 generates the even-path non-inverted multiplexer output MXOPevn and the even-path inverted multiplexer output MXONevn corresponding to the sampled data sa(C) (that is, mx(C), mxb(C)).

In the case that the even dynamic module 315 selects the first even-path rail-to-rail output pair sa(C)−, the even-path non-inverted multiplexer output mx(C) is equivalent to the first even-path positive rail-output APevn, and the even-path inverted multiplexer output mxb(C) is equivalent to the first even-path negative rail-output ANevn. In the case that the even dynamic module 315 selects the second even-path rail-to-rail output pair sa(C)+, the even-path non-inverted multiplexer output mx(C) is equivalent to the second even-path positive rail-output BPevn, and the even-path inverted multiplexer output mxb(C) is equivalent to the second even-path negative rail-output BNevn. The inverters 317a, 317b further convert the even-path non-inverted multiplexer output mx(C) and the even-path inverted multiplexer output mxb(C) to the even-path decision $D_{out\_evn}$.

The processing of the input data in(D), in(F) are similar to those of input data in(B), and the processing of the input data in(E) is similar to those of the input data in(C). Therefore, details about processing the input data in(D), in(E), in(F) are not described.

The delay contributors related to processing of the input data in(B) are listed at the bottom of FIG. 12. Please refer to FIGS. 5B, 6, and 12 together. The clock propagation delay $T_{clk2sa}$ of the sense amplifiers 333a, 333b is between time point t1 and time point t2, the setup time $T_{suSA}$ of the sense amplifiers 333a, 333b is between time point t2 and time point t3, and the propagation delay $T_{dyn}$ of the odd dynamic module 335 is between time point t3 and time point t5. Therefore, the processing and propagation delay caused by the odd speculative path 33 is between time point t1 and time point t4, and the operating margin $\Delta T_{tap1}$ for the speculative first-tap (tap1) is between time point t4 and time point t5.

Second Embodiment

Figure 13A:
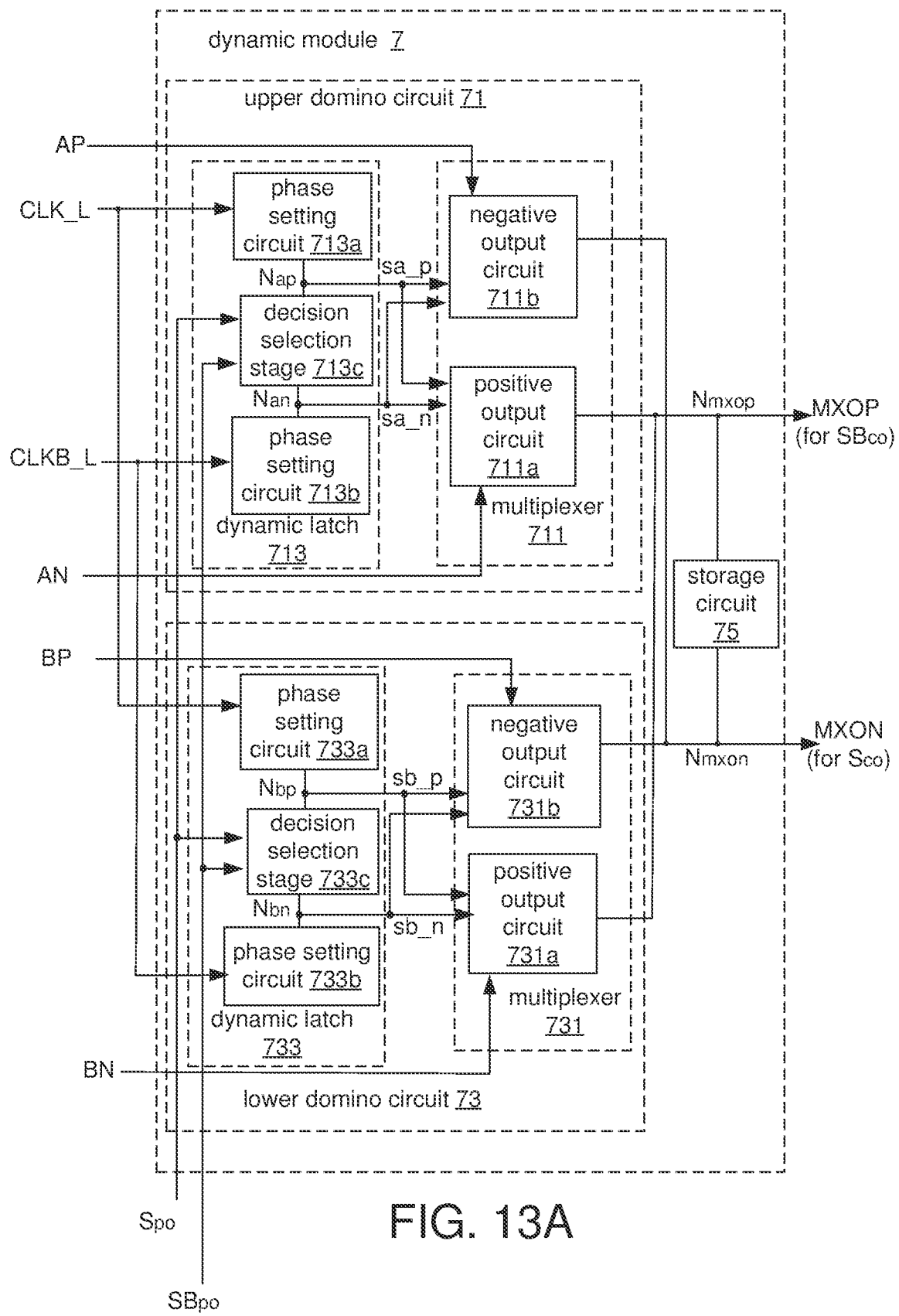
FIG. 13A is a block diagram illustrating the dynamic module according to the second embodiment of the present disclosure.
Figure 13B:
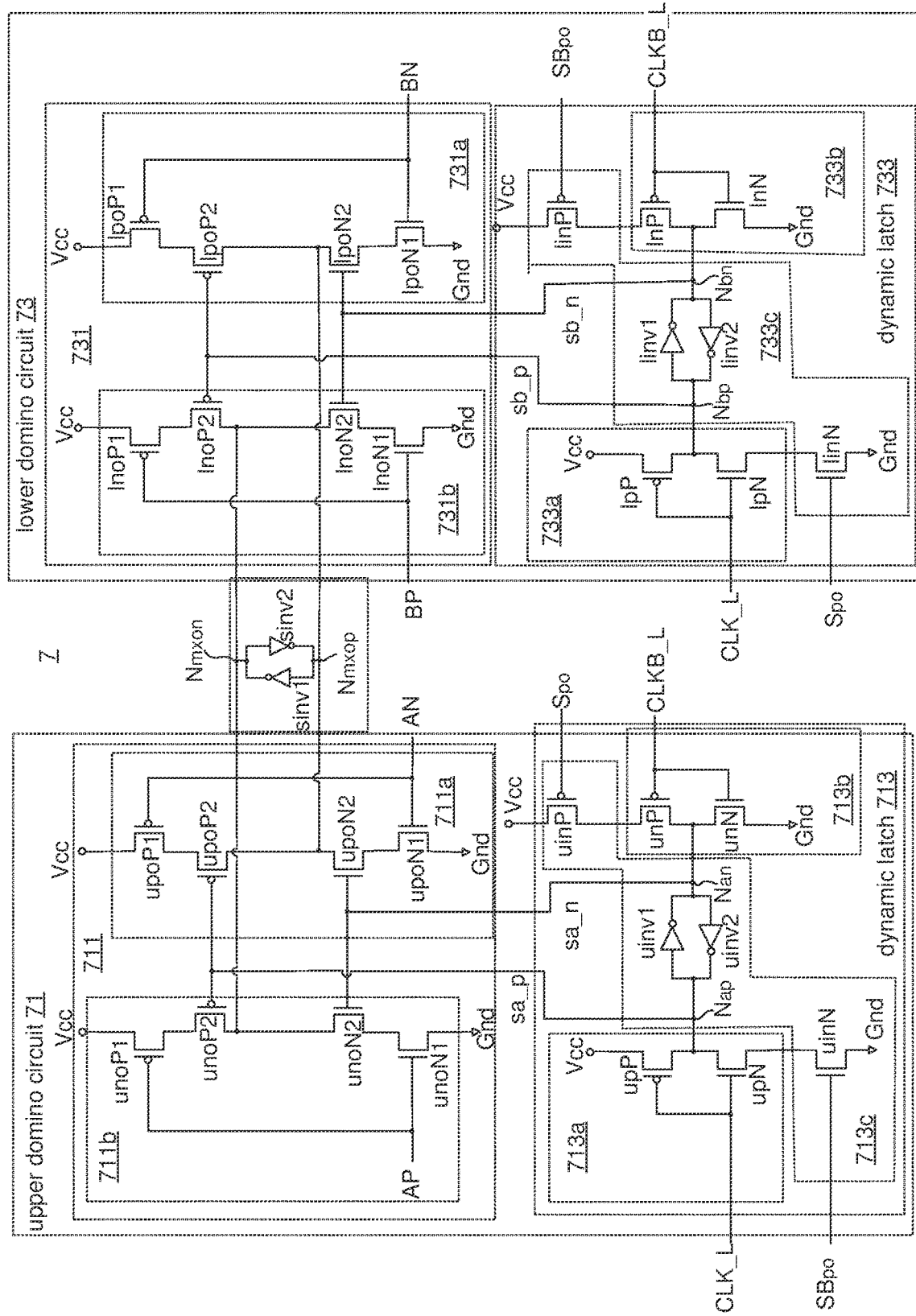
FIG. 13B is a schematic diagram illustrating the circuit design of the dynamic module according to the second embodiment of the present disclosure.
Figure 14:
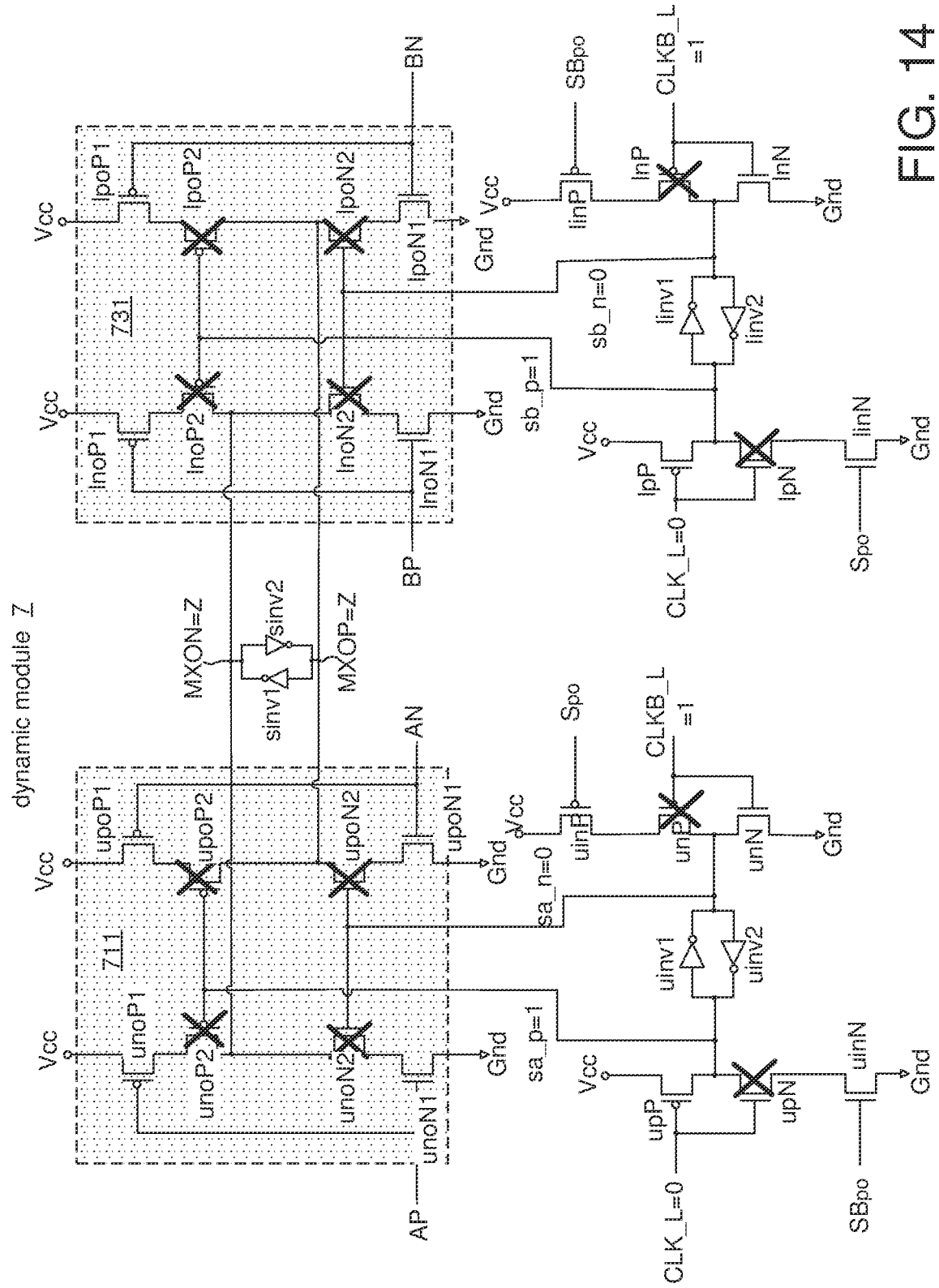
FIG. 14 is a schematic diagram how the dynamic module, according to the second embodiment of the present disclosure, operates in the precharge period $T_{pre}$.
Figure 15A:
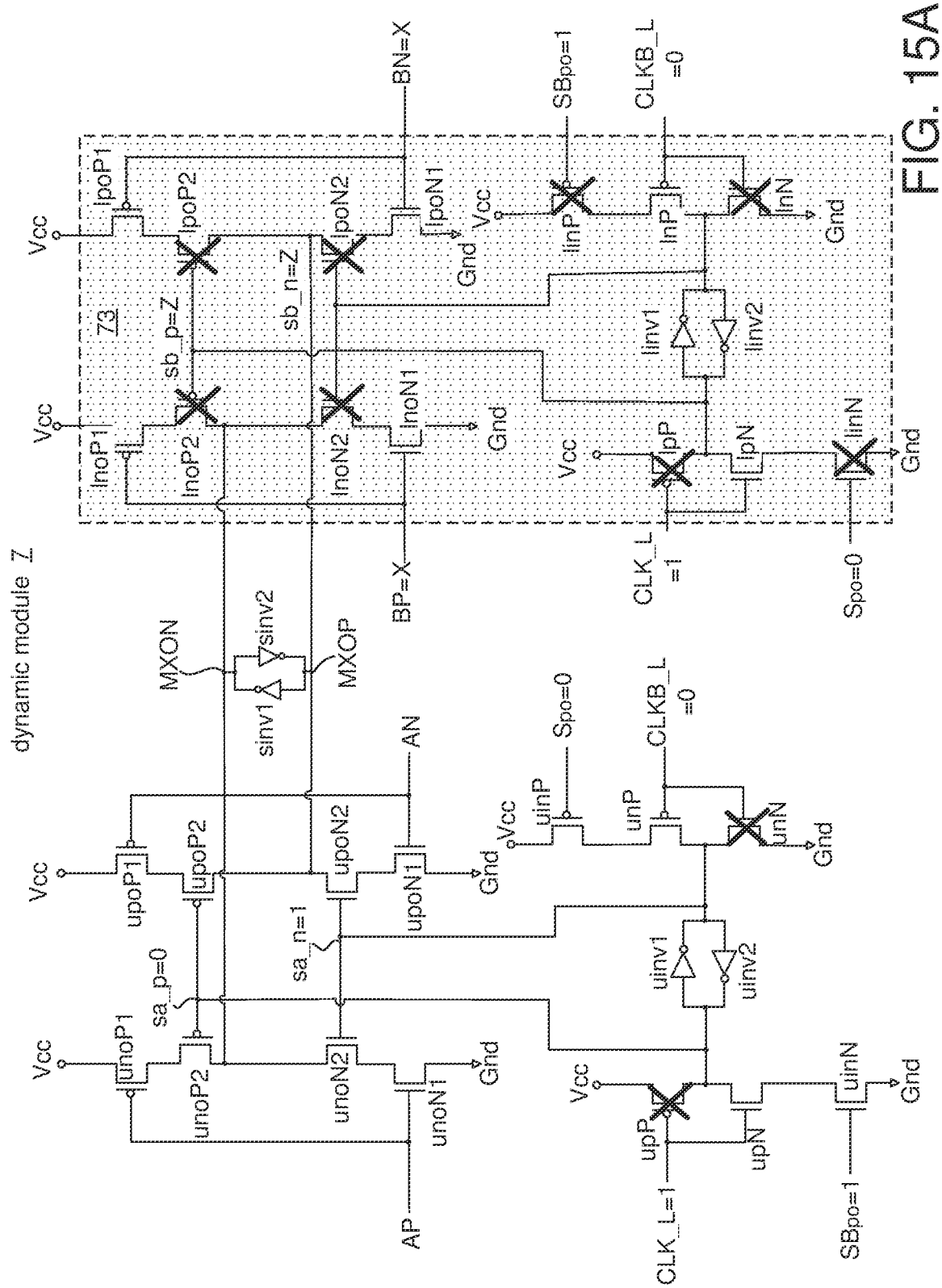
FIG. 15A is a schematic diagram illustrating how the dynamic module according to the second embodiment of the present disclosure operates in the evaluation period $T_{eva}$ when the non-inverted previous decision bit Sp is in logic low ($S_{po}$=0) and the inverted previous decision bit $SB_{po}$ is in logic high ($SB_{po}$=1).
Figure 15B:
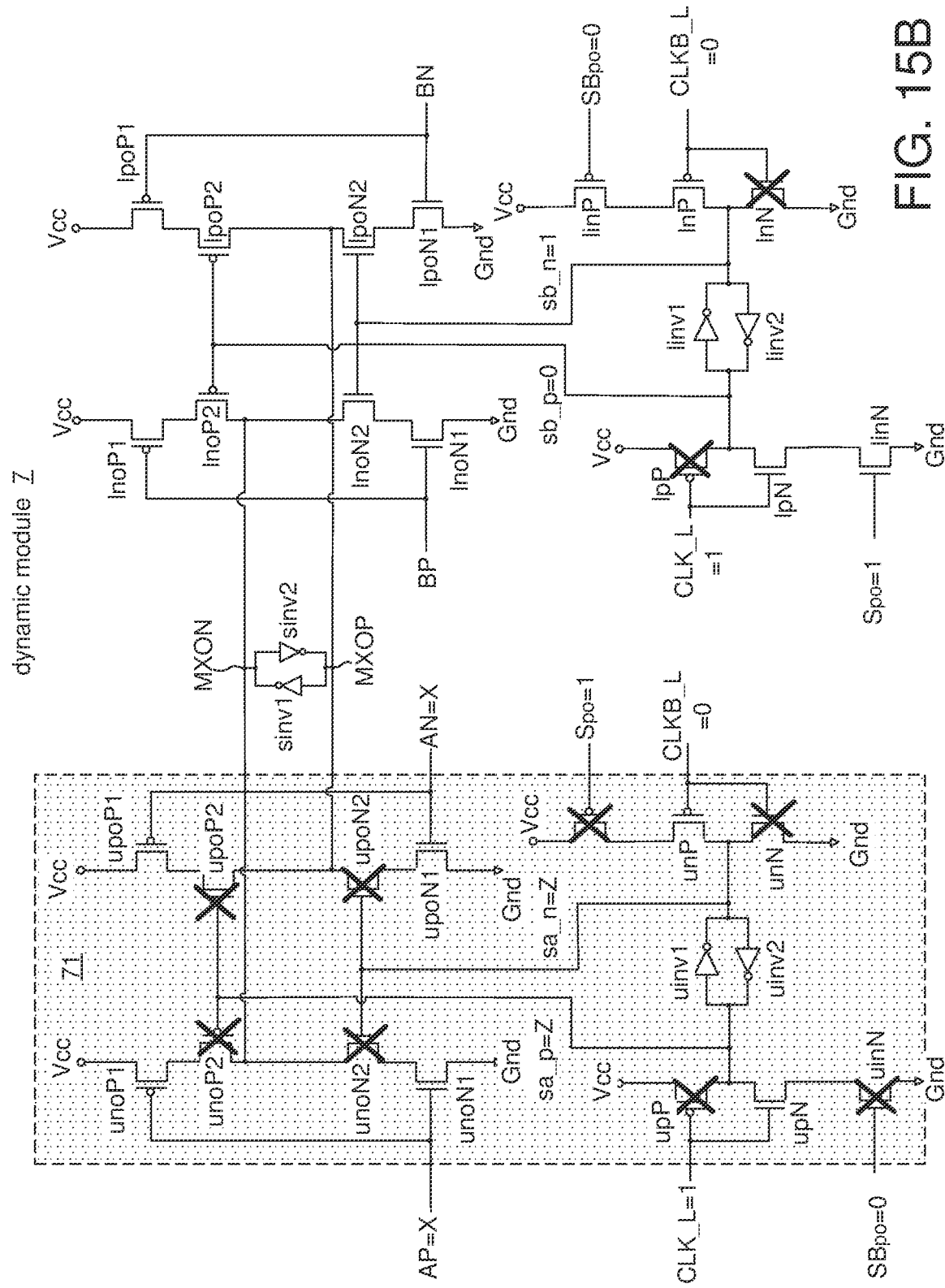
FIG. 15B is a schematic diagram illustrating how the dynamic module, according to the second embodiment of the present disclosure, operates in the evaluation period $T_{eva}$ when the non-inverted previous decision bit $S_{po}$ is in logic high ($S_{po}$=1) and the inverted previous decision bit $SB_{po}$ is in logic low ($SB_{po}$=0).
Figure 16:
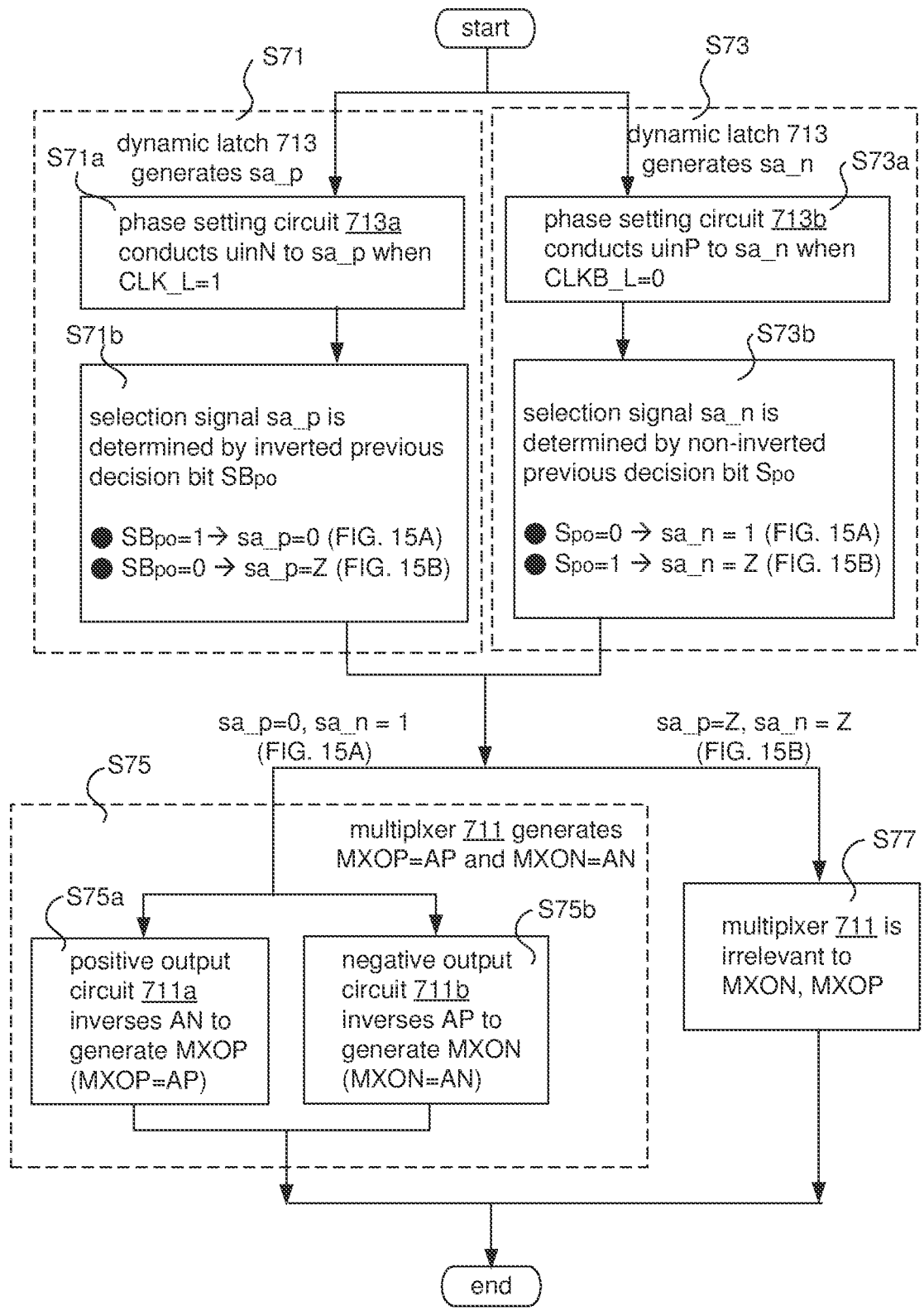
FIG. 16 is a flow diagram illustrating how the upper domino circuit, according to the second embodiment of the present disclosure, operates in the evaluation period $T_{eva}$.
Figure 18:
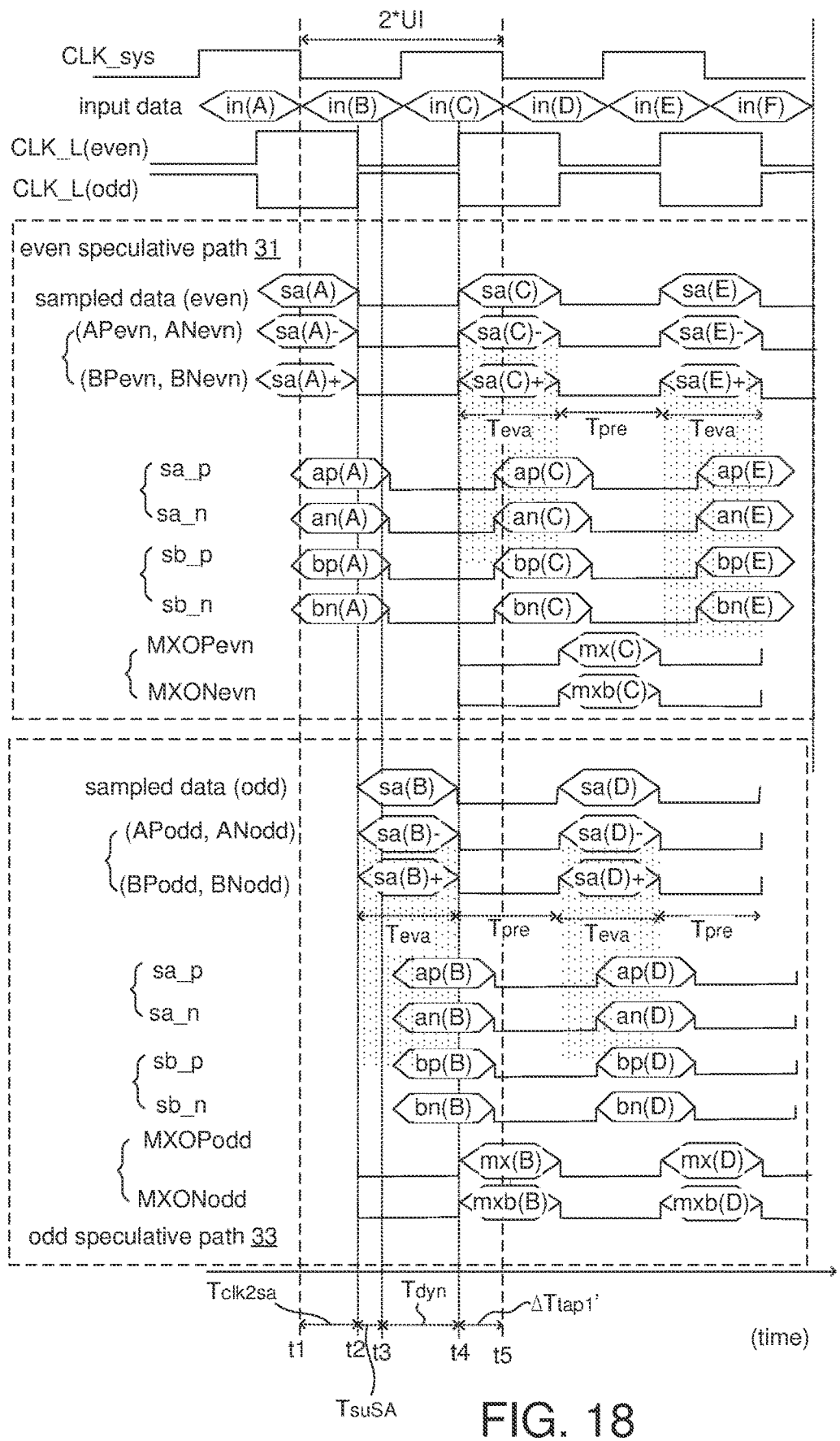
FIG. 18 is a waveform illustrating that an exemplary data stream is processed by the speculative DFE according to the second embodiment of the present disclosure.

The block diagram and the circuit design of the dynamic module 7, according to the second embodiment of the present disclosure are shown in FIGS. 13A and 13B, respectively. The operations of the dynamic module 7 in the precharge period $T_{pre}$ are illustrated in FIG. 14, and the operations of the dynamic module 7 in the evaluation period $T_{eva}$ are illustrated in FIGS. 15A, 15B, and 16. FIG. 17 lists different combinations of the signal states of the dynamic module 7. FIG. 18 further shows how the dynamic module 7 is applied to the speculative DFE 3.

FIG. 13A is a block diagram illustrating the dynamic module according to the second embodiment of the present disclosure. The dynamic module 7 includes an upper domino circuit 71, a lower domino circuit 73, and a storage circuit 75. The storage circuit 75 is electrically connected to the upper domino circuit 71 and the lower domino circuit 73 through the non-inverted multiplexer output terminal $N_{mxop}$ and the inverted multiplexer output terminal $N_{mxon}$. The upper domino circuit 71 further includes a dynamic latch 713 and a multiplexer 711, and the lower domino circuit 73 further includes a dynamic latch 733 and a multiplexer 731.

In the upper domino circuit 71, the dynamic latch 713 further includes phase setting circuits 713a, 713b, and a decision selection stage 713c, and the multiplexer 711 further includes a positive output circuit 711a and a negative output circuit 711b. In the lower domino circuit 73, the dynamic latch 733 further includes phase setting circuits 733a, 733b, and a decision selection stage 733c, and the multiplexer 731 further includes a positive output circuit 731a and a negative circuit 731b.

FIG. 13B is a schematic diagram illustrating the circuit design of the dynamic module according to the second embodiment of the present disclosure. Please refer to FIGS. 13A and 13B together.

The devices and connections in the upper domino circuit 71 are described. In the dynamic latch 713, the phase setting circuit 713a includes a PMOS transistor upP and an NMOS transistor upN, the phase setting circuit 713b includes a PMOS transistor unP and an NMOS transistor unN, and the decision selection stage 713c includes a PMOS transistor uinP, an NMOS transistor uinN, and cross-coupled inverters uinv1, uinv2.

In the phase setting circuit 713a, the gate terminals of the PMOS transistor upP and the NMOS transistor upN are electrically connected together to receive the non-inverted latch clock signal CLK_L, and the drain terminals of the PMOS transistor upP and the NMOS transistor upN are electrically connected to a selection terminal $N_{ap}$. The source terminal of the PMOS transistor upP is electrically connected to the supply voltage terminal Vcc, and the source terminal of the NMOS transistor upN is electrically connected to the decision selection stage 713c. In the phase setting circuit 713b, the gate terminals of the PMOS transistor unP and the NMOS transistor unN are electrically connected together to receive the inverted latch clock signal CLKB_L, and the drain terminals of the PMOS transistor unP and the NMOS transistor unN are electrically connected to a selection terminal Nan. The source terminal of the PMOS transistor unP is electrically connected to the decision selection stage 713c, and the source terminal of the NMOS transistor unN is electrically connected to the ground terminal Gnd.

In the decision selection stage 713c, the source terminal of the PMOS transistor uinP is electrically connected to the supply voltage terminal Vcc, and the drain terminal of the PMOS transistor uinP is electrically connected to the phase setting circuit 713b. The source terminal of the NMOS transistor uinN is electrically connected to the ground terminal Gnd, and the drain terminal of the NMOS transistor uinN is electrically connected to the phase setting circuit 713a. The gate terminal of the PMOS transistor uinP receives the non-inverted previous decision bit $S_{po}$, and the gate terminal of the NMOS transistor uinN receives the inverted previous decision bit $SB_{po}$. The cross-coupled inverters uinv1, uinv2 are electrically connected to the selection terminals $N_{ap}$, Nan. The input terminal of the inverter uinv1 and the output terminal of the inverter uinv2 are electrically connected to the selection terminal $N_{ap}$. The output terminal of the inverter uinv1 and the input terminal of the inverter uinv2 are electrically connected to the selection terminal Nan.

In the multiplexer 711, the positive output circuit 711a includes PMOS transistors upoP1, upoP2, and NMOS transistors upoN1, upoN2, and the negative output circuit 711b includes PMOS transistors unoP1, unoP2, and NMOS transistors unoN1, unoN2. In short, the positive output circuit 711a is related to the non-inverted multiplexer output MXOP, and the negative output circuit 711b is related to the inverted multiplexer output MXON.

In the positive output circuit 711a, the gate terminal of the PMOS transistor upoP2 is electrically connected to the selection terminal $N_{ap}$, and the gate terminal of the NMOS transistor upoN2 is electrically connected to the selection terminal Nan. The gate terminals of the PMOS transistor upoP1 and the NMOS transistor upoN1 are electrically connected together for receiving the first negative rail-output AN. The source terminal of the PMOS transistor upoP1 is electrically connected to the supply voltage terminal Vcc, and the drain terminal of the PMOS transistor upoP1 is electrically connected to the source terminal of the PMOS transistor upoP2. The source terminal of the NMOS transistor upoN1 is electrically connected to the ground terminal Gnd, and the drain terminal of the NMOS transistor upoN1 is electrically connected to the source terminal of the NMOS transistor upoN2. Moreover, the drain terminals of the PMOS transistor upoP2 and the NMOS transistor upoN2 are electrically connected to the non-inverted multiplexer output terminal $N_{mxop}$.

In the negative output circuit 711b, the gate terminal of the PMOS transistor unoP2 is electrically connected to the selection terminal $N_{ap}$, and the gate terminal of the NMOS transistor upoN2 is electrically connected to the selection terminal Nan. The gate terminals of the PMOS transistor unoP1 and the NMOS transistor unoN1 are electrically connected together for receiving the first positive rail-output AP. The source terminal of the PMOS transistor unoP1 is electrically connected to the supply voltage terminal Vcc, and the drain terminal of the PMOS transistor unoP1 is electrically connected to the source terminal of the PMOS transistor unoP2. The source terminal of the NMOS transistor unoN1 is electrically connected to the ground terminal Gnd, and the drain terminal of the NMOS transistor unoN1 is electrically connected to the source terminal of the NMOS transistor unoN2. Moreover, the drain terminals of the PMOS transistor unoP2 and the NMOS transistor unoN2 are electrically connected to the inverted multiplexer output terminal $N_{mxon}$.

The devices and connections in the lower domino circuit 73 are described. In the dynamic latch 733, the phase setting circuit 733a includes a PMOS transistor lpP and an NMOS transistor lpN, the phase setting circuit 733b includes a PMOS transistor lnP and an NMOS transistor lnN, and the decision selection stage 733c includes a PMOS transistor linP, an NMOS transistor linN, and cross-coupled inverters linv1, linv2.

In the phase setting circuit 733a, the gate terminals of the PMOS transistor lpP and the NMOS transistor lpN are electrically connected together for receiving the non-inverted latch clock signal CLK_L, and the drain terminals of the PMOS transistor lpP and the NMOS transistor lpN are electrically connected to a selection terminal $N_{bp}$. The source terminal of the PMOS transistor lpP is electrically connected to the supply voltage terminal Vcc, and the source terminal of the NMOS transistor lpN is electrically connected to the decision selection stage 733c. In the phase setting circuit 733b, the gate terminals of the PMOS transistor lnP and the NMOS transistor lnN are electrically connected together for receiving the inverted latch clock signal CLKB_L, and the drain terminals of the PMOS transistor lnP and the NMOS transistor lnN are electrically connected to a selection terminal $N_{bn}$. The source terminal of the PMOS transistor lnP is electrically connected to the decision selection stage 733c, and the source terminal of the NMOS transistor lnN is electrically connected to the ground terminal Gnd.

In the decision selection stage 733c, the source terminal of the PMOS transistor linP is electrically connected to the supply voltage terminal Vcc, and the drain terminal of the PMOS transistor linP is electrically connected to the phase setting circuit 733b. The source terminal of the NMOS transistor linN is electrically connected to the ground terminal Gnd, and the drain terminal of the NMOS transistor linN is electrically connected to the phase setting circuit 733a. The gate terminal of the PMOS transistor linP receives the inverted previous decision bit $SB_{po}$, and the gate terminal of the NMOS transistor linN receives the non-inverted previous decision bit $S_{po}$. The cross-coupled inverters linv1, linv2 are electrically connected to the selection terminals $N_{bp}$, $N_{bn}$. The input terminal of the inverter linv1 and the output terminal of the inverter linv2 are electrically connected to the selection terminal $N_{bp}$. The output terminal of the inverter linv1 and the input terminal of the inverter linv2 are electrically connected to the selection terminal $N_{bn}$.

In the multiplexer 731, the positive output circuit 731a includes PMOS transistors lpoP1, lpoP2, and NMOS transistors lpoN1, lpoN2, and the negative output circuit 731b includes PMOS transistors lnoP1, lnoP2 and NMOS transistors lnoN1, lnoN2. Basically, the positive output circuit 731a is related to the non-inverted multiplexer output MXOP, and the negative output circuit 711b is related to the inverted multiplexer output MXON.

In the positive output circuit 731a, the gate terminal of the PMOS transistor lpoP2 is electrically connected to the selection terminal $N_{bp}$, and the gate terminal of the NMOS transistor lpoN2 is electrically connected to the selection terminal $N_{bn}$. The gate terminals of the PMOS transistor lpoP1 and the NMOS transistor lpoN1 are electrically connected together for receiving the second negative rail-output BN. The source terminal of the PMOS transistor lpoP1 is electrically connected to the supply voltage terminal Vcc, and the drain terminal of the PMOS transistor lpoP1 is electrically connected to the source terminal of the PMOS transistor lpoP2. The source terminal of the NMOS transistor lpoN1 is electrically connected to the ground terminal Gnd, and the drain terminal of the NMOS transistor lpoN1 is electrically connected to the source terminal of the NMOS transistor lpoN2. Moreover, the drain terminals of the PMOS transistor lpoP2 and the NMOS transistor lpoN2 are electrically connected to the non-inverted multiplexer output terminal $N_{mxop}$.

In the negative output circuit 731b, the gate terminal of the PMOS transistor lnoP2 is electrically connected to the selection terminal $N_{bp}$, and the gate terminal of the NMOS transistor lnoN2 is electrically connected to the selection terminal $N_b$n. The gate terminals of the PMOS transistor lnoP1 and the NMOS transistor lnoN1 are electrically connected together for receiving the second positive rail-output BP. The source terminal of the PMOS transistor lnoP1 is electrically connected to the supply voltage terminal Vcc, and the drain terminal of the PMOS transistor lnoP1 is electrically connected to the source terminal of the PMOS transistor lnoP2. The source terminal of the NMOS transistor lnoN1 is electrically connected to the ground terminal Gnd, and the drain terminal of the NMOS transistor lnoN1 is electrically connected to the source terminal of the NMOS transistor lnoN2. Moreover, the drain terminals of the PMOS transistor lnoP2 and the NMOS transistor lnoN2 are electrically connected to the inverted multiplexer output terminal $N_{mxon}$.

The storage circuit 75 includes cross-coupled inverters sinv1, sinv2. The input terminal and the output terminal of the inverter sinv1 are respectively electrically connected to the non-inverted multiplexer output terminal $N_{mxop}$ and the inverted multiplexer output terminal $N_{mxon}$. The input terminal and the output terminal of the inverter sinv2 are respectively electrically connected to the inverted multiplexer output terminal $N_{mxon}$ and the non-inverted multiplexer output terminal $N_{mxop}$.

FIG. 14 is a schematic diagram how the dynamic module, according to the second embodiment of the present disclosure, operates in the precharge period $T_{pre}$. The components in the upper domino circuit 71 and the lower domino circuit 73 are respectively illustrated.

The operations of the phase setting circuits 713a, 713b, the decision selection stage 713c, and the multiplexer 711 in the upper domino circuit 71 are described in sequence. As the non-inverted latch clock signal CLK_L is in logic low (CLK_L=0), the PMOS transistor upP and the NMOS transistor upN in the phase setting circuit 713a are respectively turned on and turned off. As the inverted latch clock signal CLKB_L is in logic high (CLKB_L=1), the PMOS transistor unP and the NMOS transistor unN are respectively turned off and turned on. Therefore, in the upper domino circuit 71, the selection signal sa_p is set to the supply voltage Vcc (sa_p=1), and the selection signal sa_n is set to the ground voltage Gnd (sa_n=0).

The selection signal sa_p with the supply voltage Vcc (sa_p=1) results in that the PMOS transistor upoP2 in the positive output circuit 711a is turned off, and the PMOS transistor unoP2 in the negative output circuit 731b is turned off. The selection signal sa_n with the ground voltage Gnd (sa_n=0) results in that the NMOS transistor upoN2 in the positive output circuit 711a is turned off, and the NMOS transistor unoN2 in the negative output circuit 731b is turned off. Consequentially, the PMOS transistors unoP2, upoP2 and the NMOS transistors unoN2, upoN2 in the multiplexer 711, which are related to the non-inverted multiplexer output terminal $N_{mxop}$ and the inverted multiplexer output terminal $N_{mxon}$, are all turned off, and the upper domino circuit 71 does not affect the non-inverted multiplexer output MXOP and the inverted multiplexer output MXON in the precharge period $T_{pre}$.

In short, when the dynamic module 7 operates in the precharge period $T_{pre}$, that the non-inverted multiplexer output MXOP and the inverted multiplexer output MXON are not updated by the upper domino circuit 71. In FIG. 14, the multiplexer 711 is shown with dotted screen tone to represent that the multiplexer 711 does not influence the non-inverted multiplexer output MXOP and the inverted multiplexer output MXON in the precharge period $T_{pre}$.

The operations of the phase setting circuits 733a, 733b, the decision selection stage 733c, and the multiplexer 731 in the lower domino circuit 73 are symmetric to their counterparts in the upper domino circuit 71. The selection signal sb_p is set to the supply voltage Vcc (sb_p=1) because the PMOS transistor lpP is turned on by the non-inverted latch clock signal CLK_L (CLK_L=0). The selection signal sb_n is set to the ground voltage Gnd (sb_n=0) because the NMOS transistor lnN is turned on by the inverted latch clock signal CLKB_L (CLKB_L=1). In consequence, the PMOS transistors lnoP2, lpoP2, and the NMOS transistors lnoN2, lpoN2 in the multiplexer 731, which are related to the non-inverted multiplexer output terminal $N_{mxop}$ and the inverted multiplexer output terminal $N_{mxon}$, are all turned off, and the lower domino circuit 73 does not affect the non-inverted multiplexer output MXOP and the inverted multiplexer output MXON in the precharge period $T_{pre}$. In FIG. 14, the multiplexer 731 is shown with dotted screen tone to represent that the multiplexer 731 does not influence the non-inverted multiplexer output MXOP and the inverted multiplexer output MXON.

The operations of the dynamic latches 713, 813, and the multiplexers 811, 831 in the evaluation period $T_{eva}$ are described below. The operations of the dynamic module 7, when non-inverted latch clock signal CLK_L is in logic high (CLK_L=1) and the inverted latch clock signal CLKB_L is in logic low (CLKB_L=0), are shown in FIGS. 15A and 15B.

FIG. 15A is a schematic diagram illustrating how the dynamic module, according to the second embodiment of the present disclosure, operates in the evaluation period $T_{eva}$ when the non-inverted previous decision bit $S_{po}$ is in logic low ($S_{po}$=0) and the inverted previous decision bit $SB_{po}$ is in logic high ($SB_{po}$=1). On the other hand, FIG. 15B is a schematic diagram illustrating how the dynamic module, according to the second embodiment of the present disclosure, operates in the evaluation period $T_{eva}$ when the non-inverted previous decision bit $S_{po}$ is in logic high ($S_{po}$=1) and the inverted previous decision bit $SB_{po}$ is in logic low ($SB_{po}$=0).

FIG. 16 is a flow diagram illustrating how the upper domino circuit according to the second embodiment of the present disclosure operates in the evaluation period $T_{eva}$. Operations of the upper domino circuit 71 in FIGS. 15A, 15B are described together. Firstly, the dynamic latch 713 simultaneously generates the selection signal sa_p (step S71) and the selection signal sa_n (step S73).

As the NMOS transistor upN is turned on by the latch clock signal CLK_L (CLK_L=1), the NMOS transistor uinN in the decision selection stage 713c is conducted to the selection signal sa_p (step S71a), and the selection signal sa_p is determined by conduction status of the NMOS transistor uinN. The NMOS transistor uinN is further controlled by the inverted previous decision bit $SB_{po}$ (step S71b). As shown in FIG. 15A, when the inverted previous decision bit $SB_{po}$ is in logic high ($SB_{po}$=1), the selection signal sa_p is set to the ground voltage Gnd (sa_p=0). As shown in FIG. 15B, when the inverted previous decision bit $SB_{po}$ is in logic low ($SB_{po}$=0), the selection signal sa_p is floating (sa_p=Z).

As the PMOS transistor unP is turned on by the inverted latch clock signal CLKB_L (CLKB_L=0), the PMOS transistor uinP in the decision selection stage 713c is conducted to the selection signal sa_n (step S73a), and the selection signal sa_n is determined by conduction status of the PMOS transistor uinP. The PMOS transistor uinP is further controlled by the non-inverted previous decision bit $S_{po}$ (step S73b). As shown in FIG. 15A, when the non-inverted previous decision bit $S_{po}$ is in logic low ($S_{po}$=0), the selection signal sa_n is set to the supply voltage Vcc (sa_n=1). As shown in FIG. 15B, when the non-inverted previous decision bit $S_{po}$ is in logic high ($S_{po}$=1), the selection signal sa_n is floating (sa_n=Z).

Therefore, the selection signal sa_p is varied with the inverted previous decision bit $SB_{po}$, and the selection signal sa_n is varied with the non-inverted previous decision bit $S_{po}$. In response to changes of the non-inverted previous decision bit $S_{po}$ and the non-inverted previous decision bit $SB_{po}$, two different cases are respectively considered.

When the selection signals sa_p, sa_n are floating (sa_p=Z, sa_n=Z), the multiplexer 711 is disabled, and the upper domino circuit 71 is irrelevant to the non-inverted multiplexer output MXOP and the inverted multiplexer output MXON (step S77). In FIG. 15B, the components in the upper domino circuit 71 are shown in dotted screen tone to represent that the upper domino circuit 73 do not affect the non-inverted multiplexer output MXOP and the inverted multiplexer output MXON when the non-inverted previous decision bit $S_{po}$ is in logic high ($S_{po}$=1) and the inverted previous decision bit $SB_{po}$ is in logic low ($SB_{po}$=0) in the evaluation period $T_{eva}$.

When the selection signal sa_p is set to the ground voltage Gnd (sa_p=0), and the selection signal sa_n is set to the supply voltage (sa_n=1), the multiplexer 711 generates the non-inverted multiplexer output MXOP and the inverted multiplexer output MXON based on the first positive rail-output AP and the first negative rail-output AN (MXOP=AP and MXON=AN) (step S75).

As shown in FIG. 15A, the selection signal sa_n in logic low (sa_n=0) is further utilized to turn on the PMOS transistor upoP2 in the positive output circuit 711a and the PMOS transistor unoP2 in the negative output circuit 711b, and the selection signal sa_n in logic high (sa_n=1) is further utilized to turn on the NMOS transistor upoN2 in the positive output circuit 711a and the NMOS transistor unoN2 in the negative output circuit 711b.

Then, the non-inverted multiplexer output MXOP is determined by the conduction states of the PMOS transistor upoP1 and the NMOS transistor unoN1 in the positive output circuit 711a, wherein the PMOS transistor upoP1 and the NMOS transistor unoN1 are controlled by the first negative rail-output AN (step S75a). On the other hand, the inverted multiplexer output MXON is determined by the conduction states of the PMOS transistor unoP1 and the NMOS transistor unoN1 in the negative output circuit 711b, wherein the PMOS transistor unoP1 and the NMOS transistor unoN1 are controlled by the first positive rail-output AP (step S75b).

In step S75, two conditions of the first rail-to-rail output pair, (AP=0 and AN=1) and (AP=1 and AN=0), need to be concerned.

The condition that AP=0 and AN=1 is firstly described. As the first negative rail-output AN is in logic high (AN=1), in the positive output circuit 711a, the PMOS transistor upoP1 is turned off, and the NMOS transistor upoN1 is turned on. Consequentially, the non-inverted multiplexer output MXOP is equivalent to the ground voltage Gnd (MXOP=0). Meanwhile, as the first positive rail-output AP is in logic low (AP=0) in the negative output circuit 711b, the PMOS transistor unoP1 is turned on, and the NMOS transistor unoN1 is turned off. Consequentially, the inverted multiplexer output MXON is equivalent to the supply voltage Vcc (MXON=1). Therefore, the non-inverted multiplexer output MXOP and the first positive rail-output AP have the relationship MXOP=AP=0, and the inverted multiplexer output MXON and the first negative rail-output AN have the relationship MXON=AN=1 when the first rail-to-rail output pair (AP, AN) are satisfied with the conditions that the first positive rail-output AP is in logic low (AP=0) and the first negative rail-output AN is in logic high (AN=1).

The condition that AP=1 and AN=0 is now described. As the first negative rail-output AN is in logic low (AN=0), in the positive output circuit 711a, the PMOS transistor upoP1 is turned on and the NMOS transistor upoN1 is turned off. Consequentially, the non-inverted multiplexer output MXOP is equivalent to the supply voltage Vcc (MXOP=1). Meanwhile, as the first positive rail-output AP is in logic high (AP=1), in the negative output circuit 711b, the PMOS transistor unoP1 is turned off and the NMOS transistor unoN1 is turned on. Consequentially, the inverted multiplexer output MXON is equivalent to the ground voltage Gnd (MXON=0). Therefore, the non-inverted multiplexer output MXOP and the first positive rail-output AP have the relationship MXOP=AP=1, and the inverted multiplexer output MXON and the first negative rail-output AN have the relationship MXON=AN=0 when the first rail-to-rail output pair (AP, AN) are satisfied with the conditions that the first positive rail-output AP is in logic high (AP=1) and the first negative rail-output AN is in logic low (AN=0).

When the dynamic module 7 operates in the evaluation period $T_{eva}$, the phase setting circuits 713a, 713b, the decision selection stage 713c, and the multiplexer 711 in the upper domino circuit 71 operate in sequential order. The phase setting circuits 713a, 713b in the upper domino circuit 71 firstly determine whether the decision selection stage 713c is related to the selection signals sa_p, sa_n. If not (see FIG. 15B), the selection signals sa_p, sa_n in the upper domino circuit 71 are floating (sa_p=Z, sa_n=Z). If so (see FIG. 15A), the selection signals sa_p, sa_n in the upper domino circuit 71 are set to enable the positive output circuit 711a and the negative output circuit 711b, and the non-inverted multiplexer output MXOP and the inverted multiplexer output MXON are updated with the first rail-to-rail output pair AP, AN (MXOP=AP, MXON=AN).

Operations of the lower domino circuit 73 in FIGS. 15A and 15B are symmetric to those of the upper domino circuit 71 and details are not repetitively described. When the dynamic module 7 operates in the evaluation period $T_{eva}$, the phase setting circuits 733a, 733b in the lower domino circuit 73 firstly determine whether the decision selection stage 733c is related to the selection signals sb_p, sb_n. If not (see FIG. 15A), the selection signals sb_p, sb_n in the lower domino circuit 73 are floating (sb_p=Z, sb_n=Z). If so (see FIG. 15B), the selection signals sb_p, sb_n in the lower domino circuit 73 are set to enable the positive output circuit 731a and the negative output circuit 731b, and the non-inverted multiplexer output MXOP and the inverted multiplexer output MXON are updated with the second rail-to-rail output pair (BP, BN). That is MXOP=BP, and MXON=BN.

Details about how the dynamic module 7 operates in response to different input signals have been illustrated above. For the sake of comparison, FIG. 17 lists different combinations of the input signals, and their corresponding multiplexer outputs (MXOP, MXON).

FIG. 17 is a summary table listing signal states of the dynamic module in the precharge period $T_{pre}$ and in the evaluation period $T_{eva}$ according to the second embodiment of the present disclosure. The operations of the dynamic module 7 in the precharge period $T_{pre}$ are concluded from the illustrations of FIGS. 14, 15A, 15B and 16.

In the precharge period $T_{pre}$, the latch clock signal CLK_L is in logic low (CLK_L=0) and the inverted latch clock signal CLKB_L is in logic high (CLKB_L=1). Accordingly, the selection signal sa_p is in logic high (sa_p=1), the selection signal sa_n is in logic low (sa_n=0), the selection signal sb_p is in logic high (sb_p=1), the selection signal sb_n is in logic low (sb_n=0). With these selection signals sa_p, sa_n, sb_p, sb_n, the non-inverted previous decision bit $S_{po}$, the inverted previous decision bit $SB_{po}$, the first rail-to-rail output pair (AP, AN) and the second rail-to-rail output pair (BP, BN) are irrelevant to the non-inverted multiplexer output MXOP and the inverted multiplexer output MXON, and the non-inverted multiplexer output MXOP and the inverted multiplexer output MXON are held by the storage circuit 75.

In the evaluation period $T_{eva}$, the selection signals sa_p, sa_n, sb_p, sb_n are varied with the non-inverted previous decision bit $S_{po}$ and the non-inverted previous decision bit $SB_{po}$. When the non-inverted previous decision bit $S_{po}$ is in logic low ($S_{po}$=0) and the inverted previous decision bit $SB_{po}$ is in logic high ($SB_{po}$=1), the selection signals sa_p, sa_n in the upper domino circuit 71, the non-inverted previous decision bit $S_{po}$, and the inverted previous decision bit $SB_{po}$ have the relationships sa_p=0=$S_{po}$ and sa_n=1=$SB_{po}$, and the selection signals sb_p, sb_n in the lower domino circuit 73 are floating (sb_p=Z, sb_n=Z). Then, the non-inverted multiplexer output MXOP and the inverted multiplexer output MXON are updated with the first rail-to-rail output pair (AP, AN) (MXOP=AP, MXON=AN). On the other hand, when the non-inverted previous decision bit Sp is in logic high ($S_{po}$=1) and the inverted previous decision bit $SB_{po}$ is in logic low ($SB_{po}$=0), the selection signals sb_p, sb_n in the lower domino circuit 73, the non-inverted previous decision bit $S_{po}$, and the inverted previous decision bit $SB_{po}$ have the relationship sb_p=0=$S_{po}$ and sb_n=1=$SB_{po}$, and the selection signals sa_p, sa_n in the upper domino circuit 71 are floating (sa_p=Z, sa_n=Z). Then, the non-inverted multiplexer output MXOP and the inverted multiplexer output MXON are updated with the second rail-to-rail output pair (BP, BN) (MXOP=BP, MXON=BN).

As illustrated above, the speculative DFE 3 operates in a recursive manner, and the even speculative path 31 and the odd speculative path 33 influence each other. To clarify how to apply the dynamic module 7 to the speculative DFE 3, a waveform for illustrating signal relationships when the speculative DFE 3 adopts the dynamic module 7 is presented.

FIG. 18 is a waveform illustrating that an exemplary data stream is processed by the speculative DFE according to the second embodiment of the present disclosure. FIGS. 12 and 18 have similar waveforms, except that selection signals sa_p, sa_n, sb_p, sb_n are added in FIG. 18. Thus, waveform of the system clock signal CLK_sys, input data in(A)~in(F), the even-path non-inverted latch clock signal CLK_L(even), the odd-path non-inverted latch clock signal CLK_L(odd), the rail-to-rail output pairs (APevn, ANevn), (BPevn, BNevn), (APodd, ANodd), (BPodd, BPevn), and the even/odd-path non-inverted/inverted multiplexer outputs (MXOPevn, MXONevn, MXOPodd, MXONodd) are not repetitively illustrated.

In the even speculative path 31, the selection signals sa_p, sa_n are set to determine whether the first even-path rail-to-rail output pair (APevn, ANevn) should be selected as the even-path non-inverted multiplexer output MXOPevn and the even-path inverted multiplexer output MXONevn, and the selection signals sb_p, sb_n are set to determine whether the second even-path rail-to-rail output pair (BPevn, BNevn) should be selected as the even-path non-inverted multiplexer output MXOPevn and the even-path inverted multiplexer output MXONevn. Due to the propagation delay of the phase setting circuit, the durations, when the selection signals sb_p, sb_n in the even speculative path 31 are generated, are slightly behind the durations, when the even-path rail-to-rail output pairs (APevn, ANevn), (BPevn, BNevn) are generated, and the durations, when the even-path non-inverted multiplexer output MXOPevn and the even-path inverted multiplexer output MXONevn are generated, are slightly behind the durations, when the selection signals sb_p, sb_n in the even speculative path 31 are generated. In the even speculative path 31, the selection signals sa_p, sa_n, sb_p, sb_n corresponding to the sampled data sa(A) are labeled as ap(A), an(A), bp(A), bn(A). The selection signals sa_p, sa_n, sb_p, sb_n corresponding to the sampled data sa(C), sa(E) in the even speculative path 31 are labeled in a similar manner and not repetitively illustrated.

In the odd speculative path 33, the selection signals sa_p, sa_n are set to determine whether the first odd-path rail-to-rail output pair (APodd, ANodd) should be selected as the odd-path non-inverted multiplexer output MXOPodd and the odd-path inverted multiplexer output MXONodd, and the selection signals sb_p, sb_n are set to determine whether the second odd-path rail-to-rail output pair (BPodd, BNodd) should be selected as the odd-path non-inverted multiplexer output MXOPodd and the odd-path inverted multiplexer output MXONodd. Due to the propagation delay of the phase setting circuit, the durations when the selection signals sb_p, sb_n in the odd speculative path 33 are generated are slightly behind the durations when the odd-path rail-to-rail output pairs (APodd, ANodd), (BPodd, BNodd) are generated, and the durations when the odd-path non-inverted multiplexer output MXOPodd and the odd-path inverted multiplexer output MXONodd are generated are slightly behind the durations when the selection signals sb_p, sb_n in the odd speculative path 33 are generated. In the odd speculative path 33, the selection signals sa_p, sa_n, sb_p, sb_n corresponding to the sampled data sa(B) are labeled as ap(B), an(B), bp(B), bn(B). The selection signals sa_p, sa_n, sb_p, sb_n corresponding to the sampled data sa(D) in the odd speculative path 33 are labeled in a similar manner and not repetitively illustrated.

The delay contributors for generating the speculative first-tap (tap1) of the input data in(B) are listed at the bottom of FIG. 18. Please refer to FIGS. 5B, 6 and 18 together. The clock propagation delay $T_{clk2sa}$ of the sense amplifiers 333a, 333b is between time point t1 and time point t2, the setup time $T_{suSA}$ of the sense amplifiers 333a, 333b is between time point t2 and time point t3, and the propagation delay $T_{dyn}$ of the odd speculative path 33 is between time point t3 and time point t5. Therefore, the processing and propagation delay caused by the odd dynamic module 335 is between time point t1 and time point t4, and the operating margin of the speculative first-tap (tap1) is between time point t4 and time point t5.

Please refer to FIGS. 12 and 18 together. As shown in FIG. 12, the non-inverted multiplexer output MXOP and the inverted multiplexer output MXON in the first embodiment are directly determined by the first rail-to-rail output pair (AP, AN) and the second rail-to-rail output pair (BP, BN). On the other hand, as shown in FIG. 18, the non-inverted multiplexer output MXOP and the inverted multiplexer output MXON in the second embodiment are determined by the selection signals sa_p, sa_n, sb_p, sb_n, wherein the selection signals sa_p, sa_n, sb_p, sb_n are determined based on the first rail-to-rail output pair (AP, AN) and the second rail-to-rail output pair (BP, BN). In consequence, the propagation delay $T_{dyn}$ of the dynamic module 6 is shorter than the propagation delay $T_{dyn}$ of the dynamic module 7.

Alternatively speaking, the non-inverted multiplexer output MXOP and the inverted multiplexer output MXON in the first embodiment, and the second embodiment are respectively corresponding to a one-stage approach and a two-stage approach. That is, instead of directly generating the non-inverted multiplexer output MXOP and the inverted multiplexer output MXON based on the rail-outputs (AP, AN), (BP, BN) like the first embodiment, the selection signals (sa_p, sa_n, sb_p, sb_n) in the second embodiment are generated in advance. Then, the selection signals (sa_p, sa_n, sb_p, sb_n) are further utilized to generate the non-inverted multiplexer output MXOP and the inverted multiplexer output MXON.

Third Embodiment

Figure 19A:
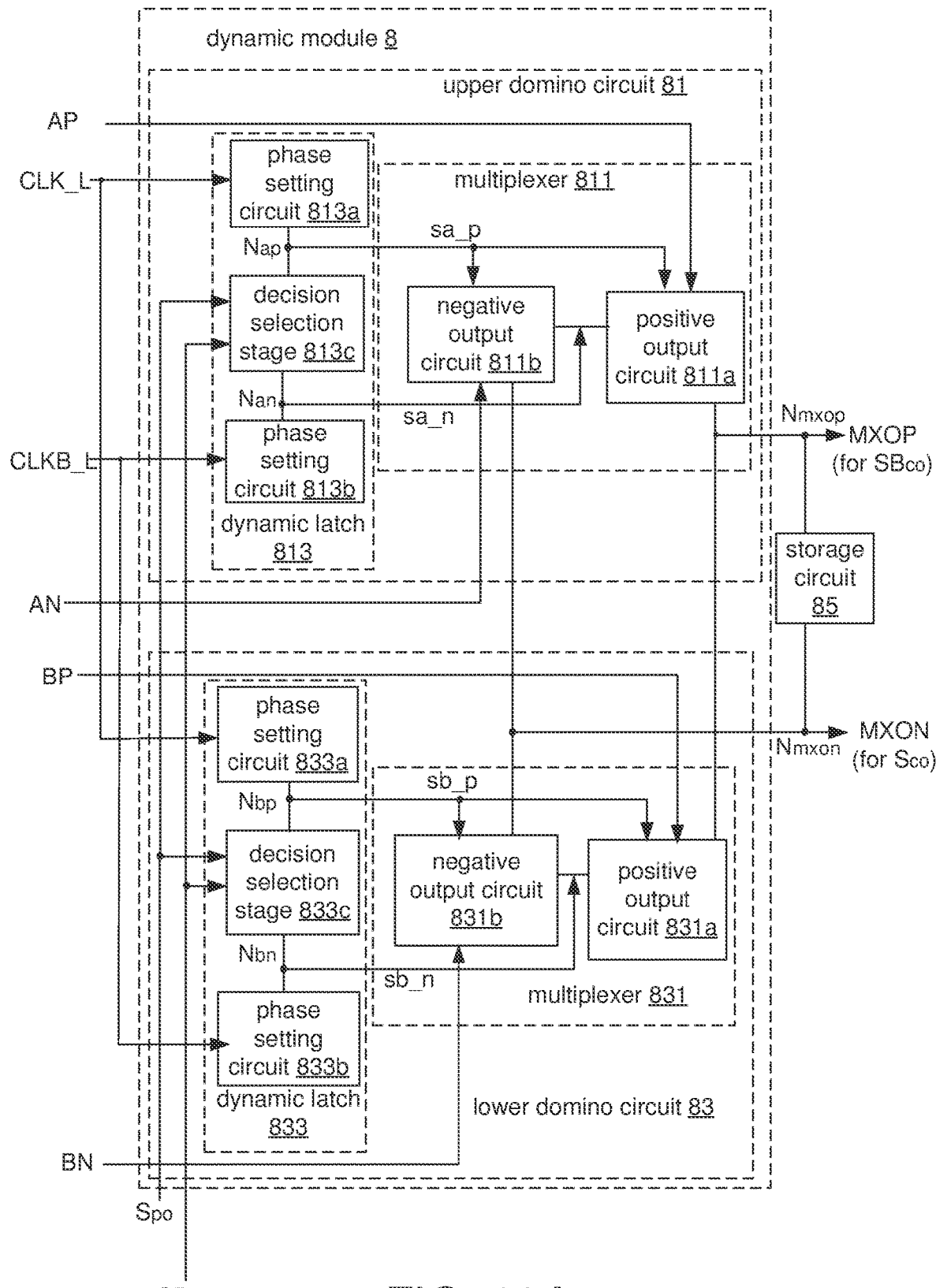
FIG. 19A is a block diagram illustrating the dynamic module according to the third embodiment of the present disclosure.
Figure 19B:
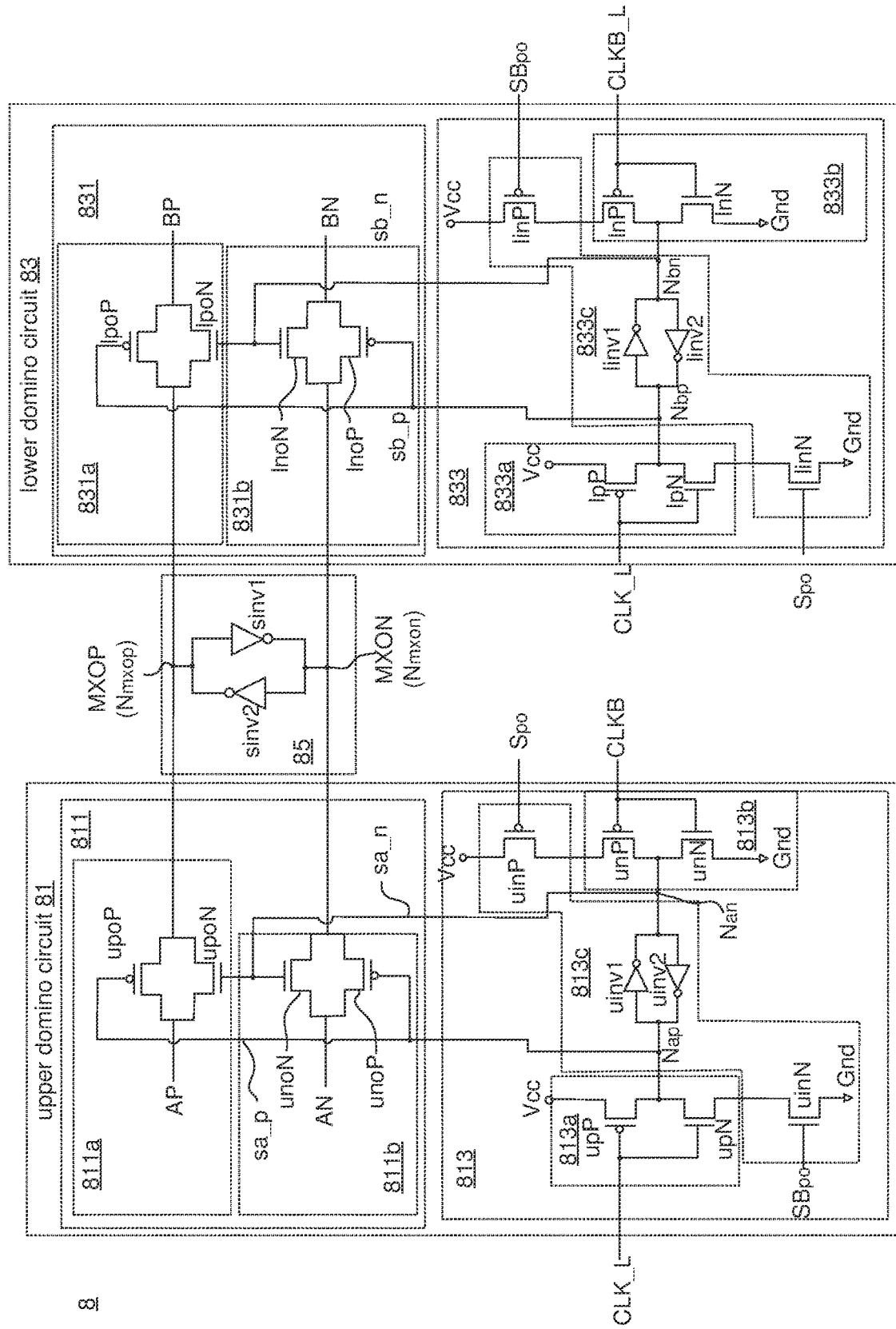
FIG. 19B is a schematic diagram illustrating the circuit design of the dynamic module according to the third embodiment of the present disclosure.
Figure 20:
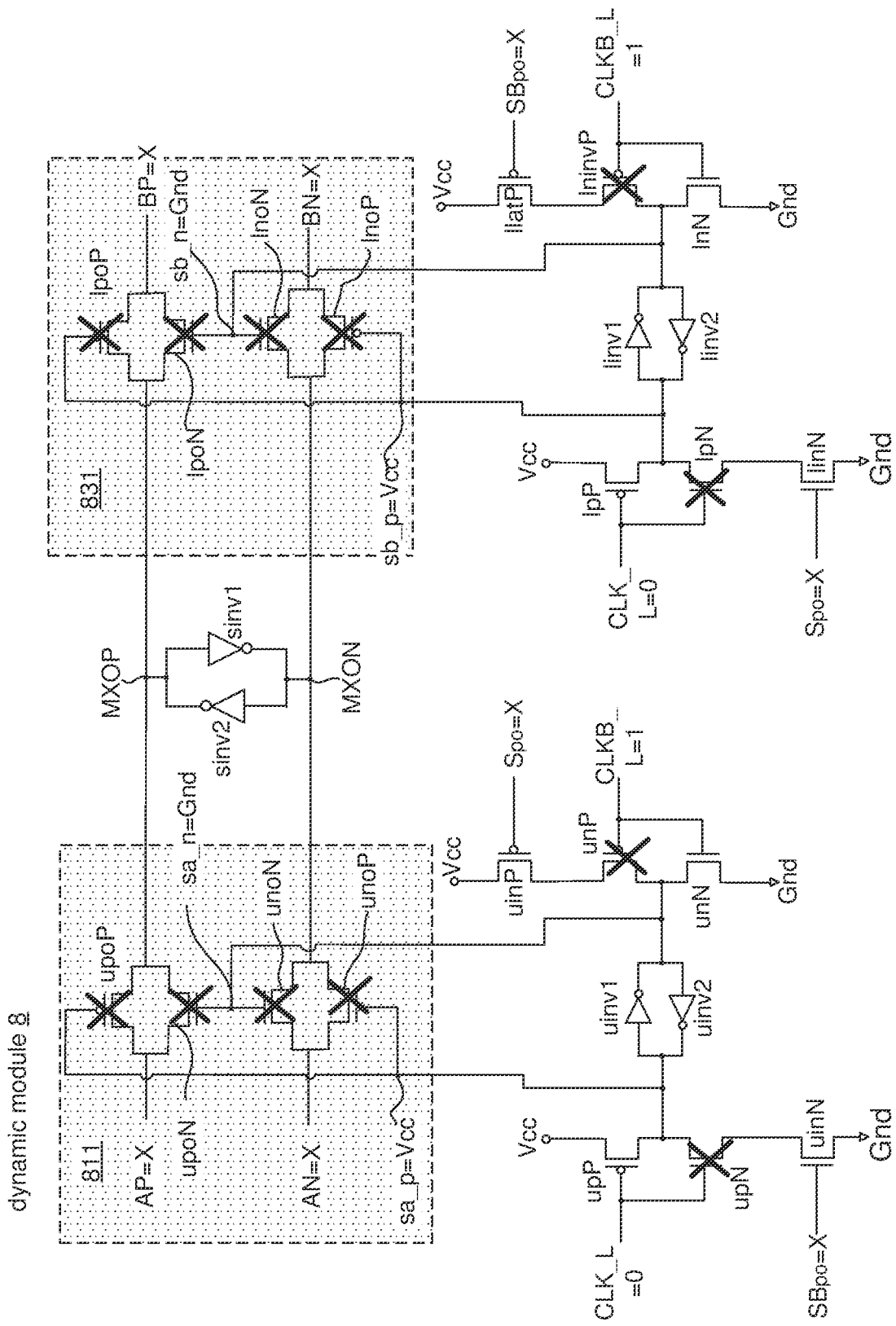
FIG. 20 is a schematic diagram illustrating how the dynamic module, according to the third embodiment of the present disclosure, operates in the precharge period $T_{pre}$.
Figure 21A:
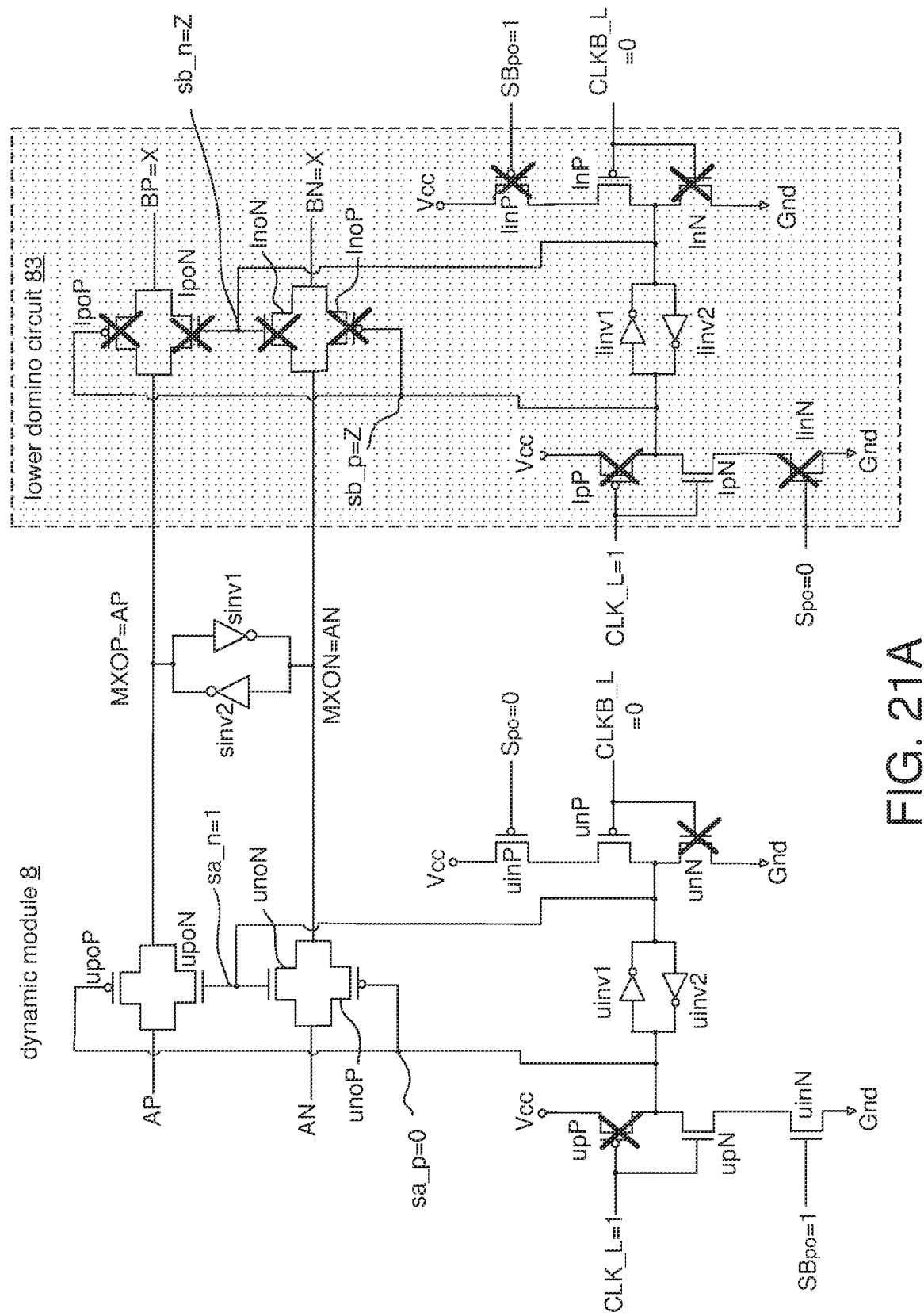
FIG. 21A is a schematic diagram illustrating how the dynamic module, according to the third embodiment of the present disclosure, operates in the evaluation period $T_{eva}$ when the non-inverted previous decision bit $S_{po}$ is in logic low ($S_{po}$=0) and the inverted previous decision bit $SB_{po}$ is in logic high ($SB_{po}$=1).
Figure 21B:
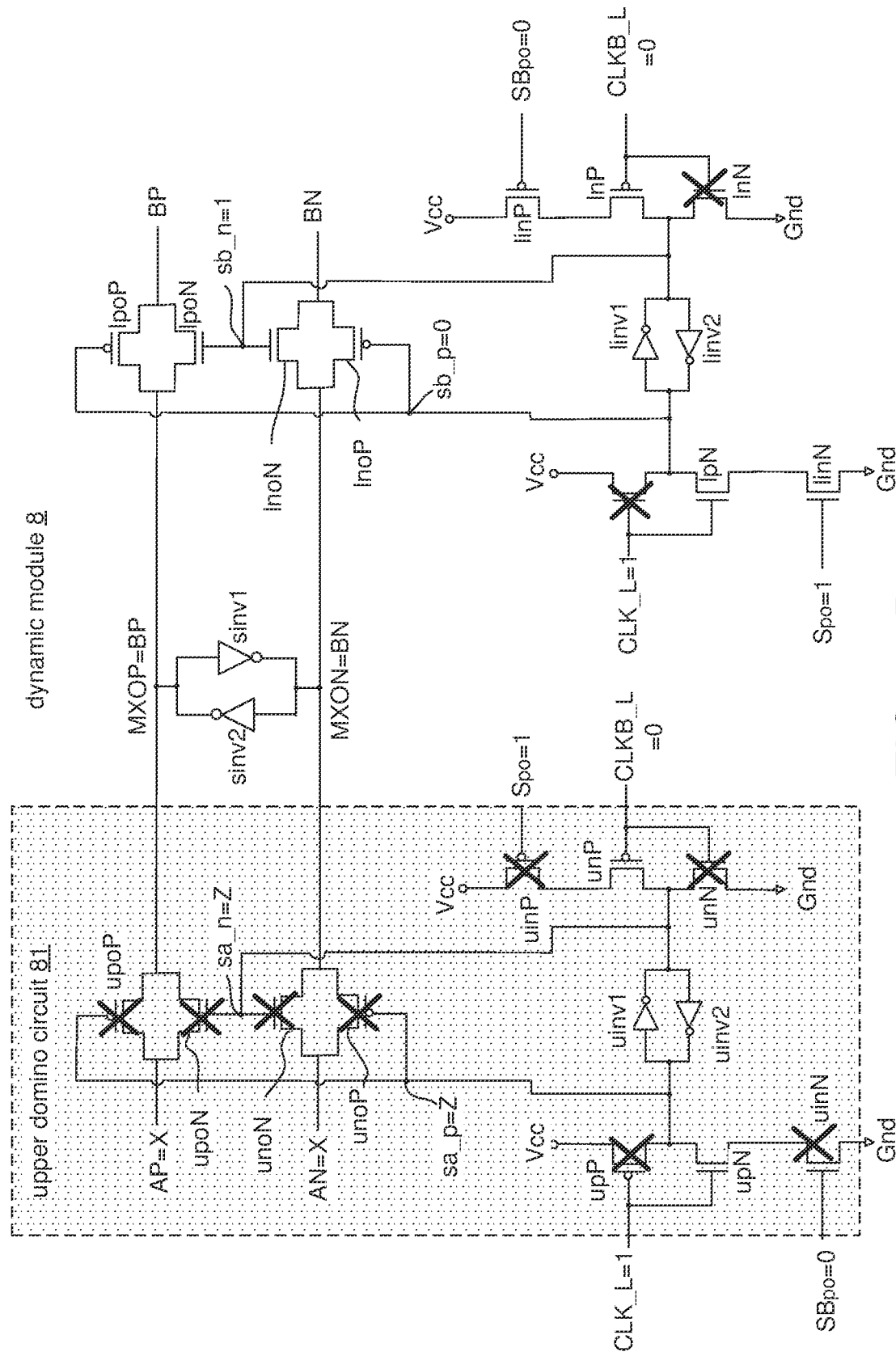
FIG. 21B is a schematic diagram illustrating how the dynamic module, according to the third embodiment of the present disclosure, operates in the evaluation period $T_{eva}$ when the non-inverted previous decision bit $S_{po}$ is in logic high ($S_{po}$=1) and the inverted previous decision bit $SB_{po}$ is in logic low ($SB_{po}$=0).
Figure 22:
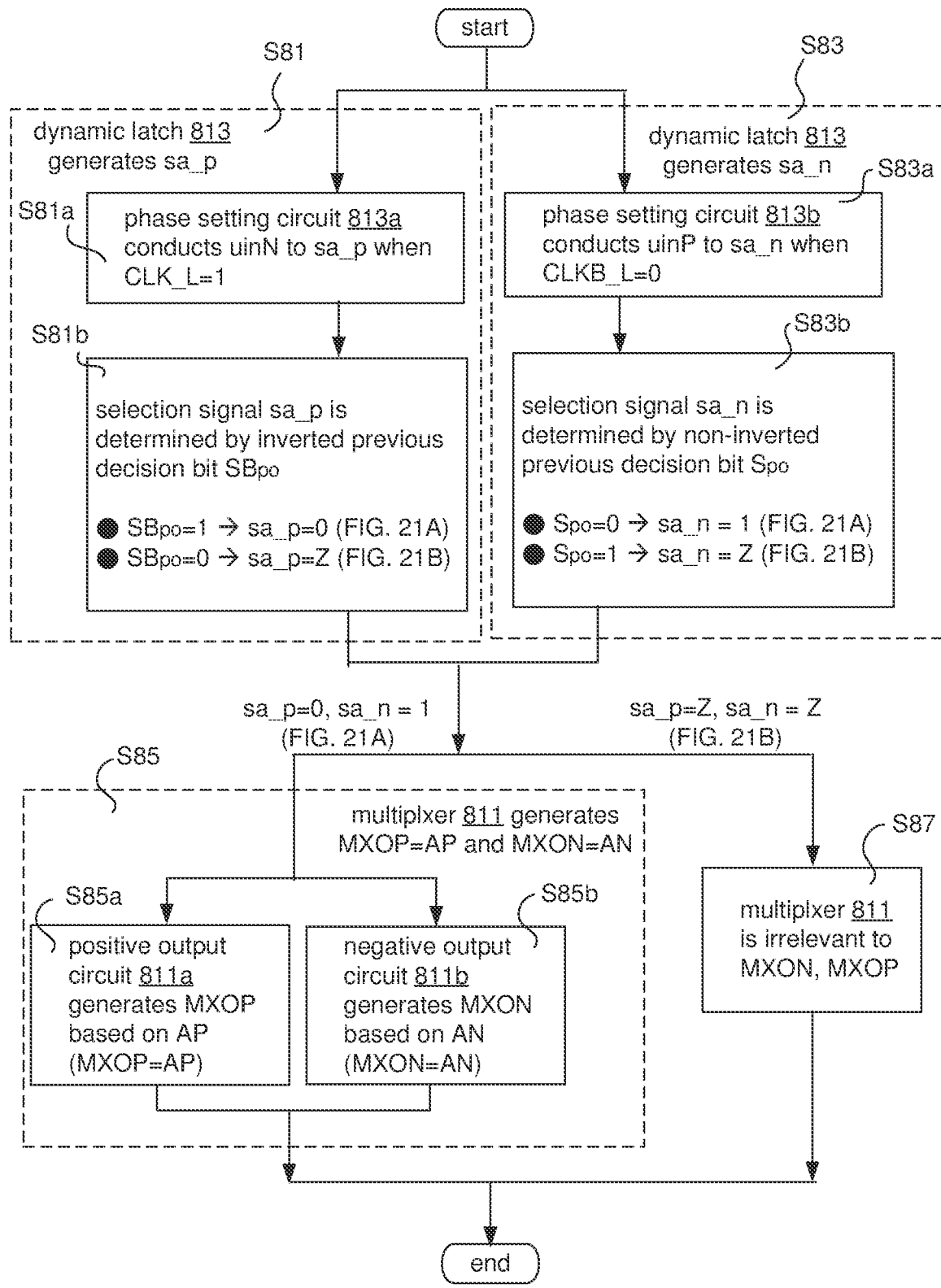
FIG. 22 is a flow diagram illustrating how the upper domino circuit, according to the third embodiment of the present disclosure, operates in the evaluation period $T_{eva}$.

The block diagram and the circuit design of the dynamic module 8, according to the third embodiment of the present disclosure, are shown in FIGS. 19A and 19B, respectively. The operations of the dynamic module 8 in the precharge period $T_{pre}$ are illustrated in FIG. 20, and the operations of the dynamic module 8 in the evaluation period $T_{eva}$ are illustrated in FIGS. 21A, 21B and 22. FIG. 23 lists different combinations of the signal states of the dynamic module 8.

FIG. 19A is a block diagram illustrating the dynamic module according to the third embodiment of the present disclosure. The dynamic module 8 includes an upper domino circuit 81, a lower domino circuit 83, and a storage circuit 85. The upper domino circuit 81 further includes a dynamic latch 813 and a multiplexer 811, and the lower domino circuit 83 further includes a dynamic latch 833 and a multiplexer 831.

Please refer to FIGS. 13A and 19A together. The dynamic module 7 in FIG. 13A and the dynamic module 8 in FIG. 19A have similar components and interconnections. The dynamic module 7 and the dynamic module 8 are different in the positions and layout of the multiplexers 711, 811, 731, 831. In the dynamic module 7, the components in the multiplexers 711, 731 are arranged in a vertical direction. On the other hand, in the dynamic module 8, the components in the multiplexers 811, 831 are arranged in a horizontal direction.

FIG. 19B is a schematic diagram illustrating the circuit design of the dynamic module according to the third embodiment of the present disclosure. As the devices of the dynamic latches 813, 833 in the third embodiment are similar to those of in the second embodiment, the devices and connections in the dynamic latches 813, 833 are not repetitively described here. Only the devices and connections in the multiplexers 811, 831 are described. Basically, the positive output circuits 811a, 831a, and the negative output circuit 811b, 831b are implemented with transmission gates.

In the multiplexer 811, the positive output circuit 811a includes a PMOS transistor upoP and an NMOS transistor upoN, and the negative output circuit 811b includes a PMOS transistor unoP and an NMOS transistor unoN. The gate terminals of the PMOS transistors upoP, unoP are electrically connected to the selection terminal $N_{ap}$. The gate terminals of the NMOS transistors upoN, unoN are electrically connected to the selection terminal Nan. The signal relationships of the components in the multiplexer 811 are described below.

In the positive output circuit 811a, the source terminal of the PMOS transistor upoP and the drain terminal of the NMOS transistor upoN collectively receive the first positive rail-output AP, and the drain terminal of the PMOS transistor upoP and the source terminal of the NMOS transistor upoN are electrically connected to the non-inverted multiplexer output terminal $N_{mxop}$. In the negative output circuit 811b, the source terminal of the PMOS transistor unoP and the drain terminal of the NMOS transistor unoN collectively receive the first negative rail-output AN, and the drain terminal of the PMOS transistor unoP and the source terminal of the NMOS transistor unoN are electrically connected to the inverted multiplexer output terminal $N_{mxon}$.

In the multiplexer 831, the positive output circuit 831a includes a PMOS transistor lpoP and an NMOS transistor lpoN, and the negative output circuit 831b includes a PMOS transistor lnoP and an NMOS transistor lnoN. The gate terminals of the PMOS transistors lpoP, lnoP are electrically connected to the selection terminal $N_{bp}$. The gate terminals of the NMOS transistors lpoN, lnoN are electrically connected to the selection terminal $N_{b}n$. The signal relationships in the multiplexer 811 are described.

In the positive output circuit 831a, the source terminal of the PMOS transistor lpoP and the drain terminal of the NMOS transistor lpoN collectively receive the second positive rail-output BP, and the drain terminal of the PMOS transistor lpoP and the source terminal of the NMOS transistor lpoN are electrically connected to the inverted multiplexer output terminal $N_{mxop}$. In the negative output circuit 831b, the source terminal of the PMOS transistor lnoP and the drain terminal of the NMOS transistor lnoN collectively receive the second negative rail-output BN, and the drain terminal of the PMOS transistor lnoP and the source terminal of the NMOS transistor lnoN are electrically connected to the inverted multiplexer output terminal $N_{mxon}$.

The storage circuit 85 includes cross-coupled inverters sinv1, sinv2. The input terminal and the output terminal of the inverter sinv1 are respectively electrically connected to the non-inverted multiplexer output terminal $N_{mxop}$ and the inverted multiplexer output terminal $N_{mxon}$. The input terminal and the output terminal of the inverter sinv2 are respectively electrically connected to the inverted multiplexer output terminal $N_{mxon}$ and the non-inverted multiplexer output terminal $N_{mxop}$.

FIG. 20 is a schematic diagram illustrating how the dynamic module, according to the third embodiment of the present disclosure, operates in the precharge period $T_{pre}$. As the phase setting circuits 813a, 813b, and the decision selection stage 813c in the third embodiment are similar to those in the second embodiment, generation of the selection signals sa_p=1, sa_n=0, sb_p=1, sb_n=0 are similar to FIG. 14 and descriptions are omitted.

The operations the multiplexer 811 are illustrated. As the selection signal sa_p is set to the supply voltage Vcc (sa_p=1), the PMOS transistor upoP in the positive output circuit 811a is turned off, and the PMOS transistor unoP in the negative output circuit 811b is turned off. As the selection signal sa_n is set to the ground voltage Gnd (sa_n=0), the NMOS transistor upoN in the positive output circuit 811a is turned off, and the NMOS transistor unoN in the negative output circuit 811b is turned off. As all PMOS transistors upoP, unoP, and the NMOS transistors upoN, unoN in the multiplexer 811 are all turned off, the multiplexer 811 is disabled, and the upper domino circuit 81 does not affect the non-inverted multiplexer output MXOP nor the inverted multiplexer output MXON in the precharge period $T_{pre}$.

Similarly, all PMOS transistors lpoP, lnoP, and the NMOS transistors lpoN, lnoN in the multiplexer 831 are all turned off because the selection signal sb_p is set to the supply voltage Vcc (sb_p=1) and the selection signal sb_n is set to the ground voltage Gnd (sb_n=0). Therefore, according to the third embodiment of the present disclosure, the multiplexer 831 is disabled, and the lower domino circuit 83 does not affect the non-inverted multiplexer output MXOP and the inverted multiplexer output MXON in the precharge period $T_{pre}$.

In the precharge period $T_{pre}$, the storage circuit 65 holds the non-inverted multiplexer output MXOP and the inverted multiplexer output MXON, with the states stored from the evaluation period $T_{eva}$. In FIG. 20, the multiplexers 811, 831 are shown with dotted screen tone to represent that the multiplexers 811, 831 are disabled in the precharge period $T_{pre}$.

FIGS. 21A and 21B demonstrate the signal and component states of the dynamic module 8 when the dynamic module 8 operates in the evaluation period $T_{eva}$. FIG. 21A is a schematic diagram illustrating how the dynamic module according to the third embodiment of the present disclosure operates in the evaluation period $T_{eva}$ when the non-inverted previous decision bit $S_{po}$ is in logic low ($S_{po}$=0) and the inverted previous decision bit $SB_{po}$ is in logic high ($SB_{po}$=1). FIG. 21B is a schematic diagram illustrating how the dynamic module, according to the third embodiment of the present disclosure, operates in the evaluation period $T_{eva}$ when the non-inverted previous decision bit $S_{po}$ is in logic high ($S_{po}$=1) and the inverted previous decision bit $SB_{po}$ is in logic low ($SB_{po}$=0).

FIG. 22 is a flow diagram illustrating how the upper domino circuit, according to the third embodiment of the present disclosure, operates in the evaluation period $T_{eva}$. Please refer to FIGS. 21A, 21B, and 22 together.

As mentioned above, the devices and their interconnections of the dynamic latches 813 are similar to those of the dynamic latches 713 in the second embodiment. Therefore, steps S81a, S81b, S83a, S83b in FIG. 22 are similar to steps S71a, S71b, S73a, S73b in FIG. 16, and they are not repetitively described. Only steps S85, S87 are illustrated.

When the selection signals sa_p, sa_n are floating (sa_p=Z, sa_n=Z), the multiplexer 811 is disabled and the upper domino circuit 71 is irrelevant to the non-inverted multiplexer output MXOP and the inverted multiplexer output MXON (step S87). In FIG. 21B, the components in the upper domino circuit 81 are shown in dotted screen tone to represent that the upper domino circuit 83 does not affect the non-inverted multiplexer output MXOP and the inverted multiplexer output MXON when the non-inverted previous decision bit $S_{po}$ is in logic high ($S_{po}$=1) and the inverted previous decision bit $SB_{po}$ is in logic low ($SB_{po}$=0) in the evaluation period $T_{eva}$.

When the selection signal sa_p is set to the ground voltage Gnd (sa_p=0), and the selection signal sa_n is set to the supply voltage Vcc (sa_n=1), the multiplexer 811 generates the non-inverted multiplexer output MXOP and the inverted multiplexer output MXON based on the first positive rail-output AP and the first negative rail-output AN (MXOP=AP and MXON=AN) (step S85).

As shown in FIG. 21A, the selection signal sa_n in logic low (sa_n=0) is further utilized to turn on the PMOS transistor upoP in the positive output circuit 811a and the PMOS transistor unoP in the negative output circuit 811b, and the selection signal sa_n in logic high (sa_n=1) is further utilized to turn on the NMOS transistor upoN in the positive output circuit 811a and the NMOS transistor unoN in the negative output circuit 811b.

Then, the positive output circuit 811a conducts the first positive rail-output AP to the non-inverted multiplexer output terminal $N_{mxop}$, as the non-inverted multiplexer output MXOP (step S85a). On the other hand, the negative output circuit 811b conducts the first negative rail-output AP to the inverted multiplexer output terminal $N_{mxon}$, as the inverted multiplexer output MXON (step S85b).

As shown in FIG. 21A, the selection signal sa_n in logic low (sa_n=Gnd) is further utilized to turn on the PMOS transistor upoP in the positive output circuit 811a and the PMOS transistor unoP in the negative output circuit 811b, and the selection signal sa_n in logic high (sa_n=Vcc) is further utilized to turn on the NMOS transistor upoN in the positive output circuit 811a and the NMOS transistor unoN in the negative output circuit 811b.

Then, the positive output circuit 811a conducts the first positive rail-output AP to the non-inverted multiplexer output terminal $N_{mxop}$, as the non-inverted multiplexer output MXOP (step S85a). On the other hand, the negative output circuit 811b conducts the first negative rail-output AP to the inverted multiplexer output terminal $N_{mxon}$, as the inverted multiplexer output MXON (step S85b).

According to FIG. 22, when the dynamic module 8 operates in the evaluation period $T_{eva}$, the phase setting circuits 813a, 813b, the decision selection stage 813c, and the multiplexer 811 in the upper domino circuit 81 operate in sequential order. The phase setting circuits 813a, 813b in the upper domino circuit 81 firstly determine whether the decision selection stage 813c is related to the selection signals sa_p, sa_n. If not (see FIG. 21B), the selection signals sa_p, sa_n are floating (sa_p=Z, sa_n=Z), and the multiplexer 811 is disabled. If so (see FIG. 21A), the selection signals sa_p, sa_n are set to enable the positive output circuit 811a and the negative output circuit 811b, and the non-inverted multiplexer output MXOP and the inverted multiplexer output MXON are updated with the first rail-to-rail output pair (AP, AN). That is, MXOP=AP, and MXON=AN.

Operations of the lower domino circuit 83 in FIGS. 21A, 21B are symmetric to those of the upper domino circuit 81, and detail descriptions are omitted. When the dynamic module 8 operates in the evaluation period $T_{eva}$, the phase setting circuits 833a, 833b, the decision selection stage 833c, and the multiplexer 831 in the lower domino circuit 83 operate in sequential order. The phase setting circuits 833a, 833b in the lower domino circuit 83 firstly determine whether the decision selection stage 833c is related to the selection signals sb_p, sb_n. If not (see FIG. 21A), the selection signals sb_p, sb_n are floating (sb_p=Z, sb_n=Z), and the multiplexer 831 is disabled. If so (see FIG. 21B), the selection signals sb_p, sb_n are set to enable the positive output circuit 831a, and the negative output circuit 831b, and the non-inverted multiplexer output MXOP and the inverted multiplexer output MXON are updated with the second rail-to-rail output pair (BP, BN). That is, MXOP=BP, and MXON=BN.

FIG. 23 is a summary table listing signal states of the dynamic module in the precharge period $T_{pre}$ and in the evaluation period $T_{eva}$ according to the third embodiment of the present disclosure. The operations of the dynamic module 8 in the precharge period $T_{pre}$ are concluded from FIG. 20. The operations of the dynamic module 8 in the evaluation period $T_{eva}$ are concluded from FIGS. 21A, 21B, and 22.

In the precharge period $T_{pre}$, the selection signal sa_p is set to the supply voltage Vcc (sa_p=1), the selection signal sa_n is set to the ground voltage Gnd (sa_n=0), the selection signal sb_p is set to the supply voltage Vcc (sb_p=1), and the selection signal sb_n is set to the ground voltage Gnd (sb_n=0) because the non-inverted latch clock signal CLK_L is in logic low (CLK_L=0) and the inverted latch clock signal CLKB_L is in logic high (CLKB_L=1). With the selection signals sa_p, sa_n, sb_p, sb_n, the multiplexers 811, 831 are disabled, and the non-inverted multiplexer output MXOP and the inverted multiplexer output MXON are independent of the non-inverted previous decision bit $S_{po}$ and the inverted previous decision bit $SB_{po}$. Consequentially, the non-inverted multiplexer output MXOP and the inverted multiplexer output MXON are held by the storage circuit 85.

In the evaluation period $T_{eva}$, the selection signals sa_p, sa_n, sb_p, sb_n are varied with the non-inverted previous decision bit $S_{po}$ and the inverted previous decision bit $SB_{po}$. When the non-inverted previous decision bit $S_{po}$ is in logic low ($S_{po}$=0) and the inverted previous decision bit $SB_{po}$ is in logic high ($SB_{po}$=1) in the evaluation period $T_{eva}$, the selection signals sa_p, sa_n in the upper domino circuit 81, the non-inverted previous decision bit $S_{po}$, and the inverted previous decision bit $SB_{po}$ have the relationships sa_p==$S_{po}$, sa_n=1=$SB_{po}$, and the selection signals sb_p, sb_n in the lower domino circuit 83 are floating (sb_p=Z, sb_n=Z). Then, the non-inverted multiplexer output MXOP and the inverted multiplexer output MXON are updated with the first rail-to-rail output pair (AP, AN). On the other hand, when the non-inverted previous decision bit $S_{po}$ is in logic high ($S_{po}$=1) and the inverted previous decision bit $SB_{po}$ is in logic low ($SB_{po}$=0) in the evaluation period $T_{eva}$, the selection signals sb_p, sb_n in the lower domino circuit 83, the inverted previous decision bit $S_{po}$ and the inverted previous decision bit $SB_{po}$ have the relationships sb_p=0=$S_{po}$, sb_n=1=$SB_{po}$, and the selection signals sa_p, sa_n in the upper domino circuit 81 are floating (sa_p=Z, sa_n=Z). Then, the non-inverted multiplexer output MXOP and the inverted multiplexer output MXON are updated with the second rail-to-rail output pair (BP, BN).

The above-mentioned embodiments demonstrate that the speculative DFE can alleviate the timing requirement for the speculative first-tap (tap1), and merging of the latch and multiplexer in the dynamic module further saves more timing margin. The present disclosure can be further implemented in the quarter-rate applications.

Figure 24:
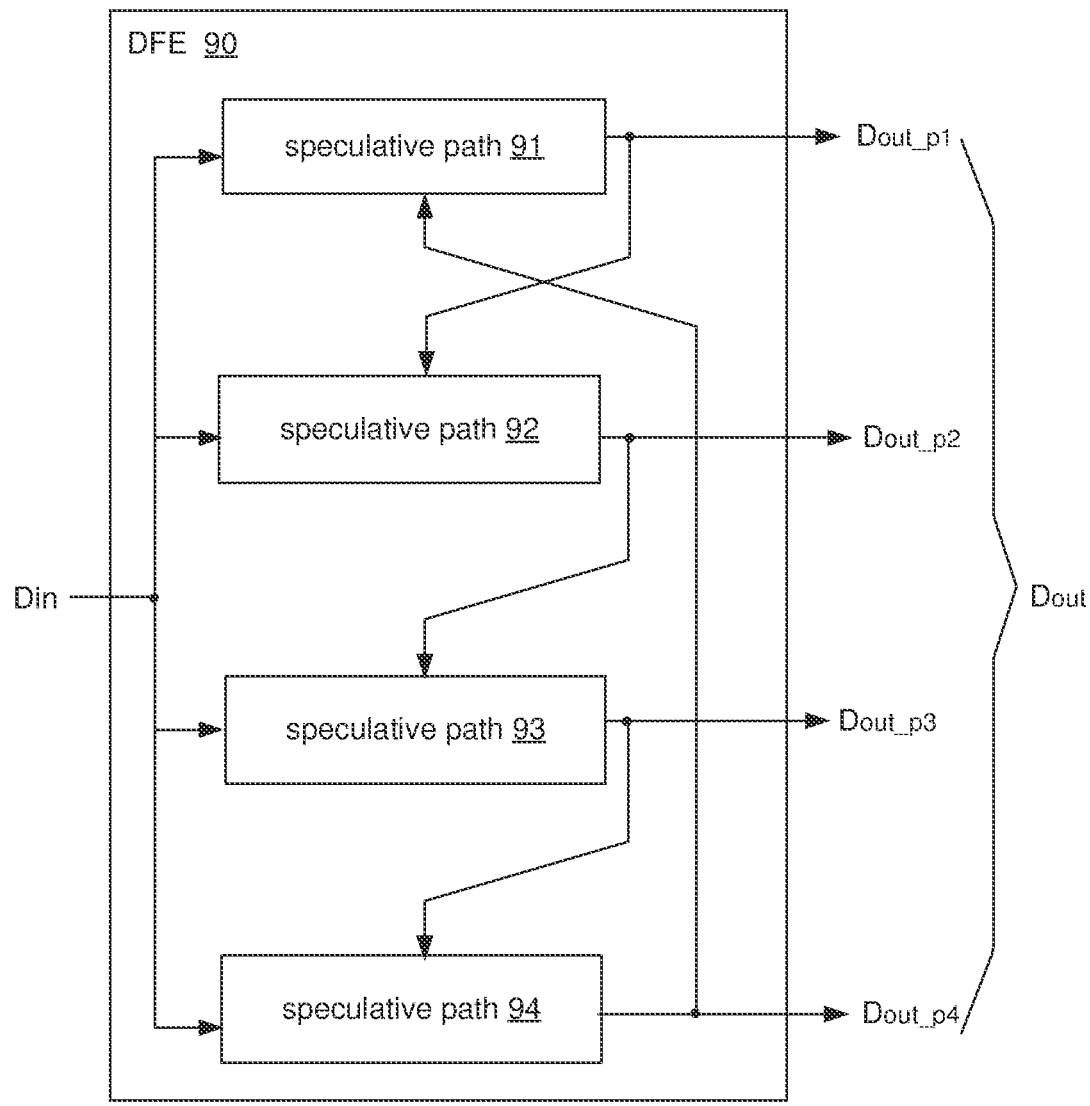
FIG. 24 is a schematic diagram illustrating the speculative DFE with a quarter-rate structure.

FIG. 24 is a schematic diagram illustrating the speculative DFE with quarter-rate structure. The speculative DFE 90 includes four quarter-paths, that is, the speculative paths 91, 92, 93, 94. The speculative paths 91, 92, 93, 94 receive the input data $D_{in}$, and the speculative paths 91, 92, 93, 94 respectively generate path decisions $D_{out\_p1}$, $D_{out\_p2}$, $D_{out\_p5}$, $D_{out\_p4}$. The path decisions $D_{out\_p1}$, $D_{out\_p2}$, $D_{out\_p3}$, $D_{out\_p4}$ jointly form the DFE output $D_{out}$. As the operations of the speculative DFE 90 can be conducted from the embodiments based on the half-rate speculative structure, detailed illustrations about the speculative DFE 90 are omitted.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A dynamic module, comprising:
    a first domino circuit, configured for generating a first multiplexer output, comprising:
        a first multiplexer, configured for receiving two of a first rail-output, a second rail-output, a third rail-output, and a fourth rail-output;
        at least one first phase setting circuit, configured for receiving a first clock signal; and
        a first decision selection stage, electrically connected to the first multiplexer and the at least one first phase setting circuit, configured for receiving a first previous decision bit and a second previous decision bit, wherein the first previous decision bit and the second previous decision bit are complementary; and
    a second domino circuit, electrically connected to the first domino circuit, configured for generating a second multiplexer output, comprising:
        a second multiplexer, configured for receiving the other two of the first rail-output, the second rail-output, the third rail-output, and the fourth rail-output;
        at least one second phase setting circuit, configured for receiving a second clock signal, wherein the first clock signal and the second clock signal are complementary; and
        a second decision selection stage, electrically connected to the second multiplexer and the at least one second phase setting circuit, configured for receiving the first previous decision bit and the second previous decision bit, wherein
    the first and the second multiplexer outputs are selectively updated with the first rail-output, the second rail-output, the third rail-output, and the fourth rail-output in an evaluation period, and
    the first multiplexer output and the second multiplexer output remain unchanged in a precharge period.

2. The dynamic module according to claim 1, wherein
    the dynamic module receives the first previous decision bit and the second previous decision bit from another dynamic module during the evaluation period, and
    the dynamic module provides a third previous decision bit and a fourth previous decision bit to the another dynamic module in the precharge period, wherein
    the third previous decision bit is generated based on the first multiplexer output, and
    the fourth previous decision bit is generated based on the second multiplexer output.

3. The dynamic module according to claim 1, wherein
    the first rail-output and the second rail-output are provided by a first sense amplifier, and the third rail-output and the fourth rail-output are provided by a second sense amplifier, wherein
    in the evaluation period, the first and second rail-outputs jointly form a first rail-to-rail output pair, and the third and fourth rail-outputs jointly form a second rail-to-rail output pair, and
    in the precharge period, the first rail-output is equivalent to the second rail-output, and the third rail-output is equivalent to the fourth-rail output.

4. The dynamic module according to claim 3, wherein
    the first multiplexer receives the first rail-output from the first sense amplifier and receives the third rail-output from the second sense amplifier, and
    the second multiplexer receives the second rail-output from the first sense amplifier and receives the fourth rail-output from the second sense amplifier.

5. The dynamic module according to claim 3, wherein
    the first multiplexer receives the first rail-output and the second rail-output from the first sense amplifier, and
    the second multiplexer receives the third rail-output and the fourth rail-output from the second sense amplifier.

6. The dynamic module according to claim 1, further comprising:
    a storage circuit, electrically connected to the first domino circuit through a first multiplexer output terminal, and electrically connected to the second domino circuit through a second multiplexer output terminal, wherein
    the first multiplexer output is generated at the first multiplexer output terminal,
    the second multiplexer output is generated at the second multiplexer output terminal, and
    the storage circuit holds the first multiplexer output and the second multiplexer output during the precharge period.

7. The dynamic module according to claim 6, wherein
    the at least one first phase setting circuit is electrically connected to the first multiplexer output terminal, and the at least one first phase setting circuit is controlled by the first clock signal, and
    the at least one second phase setting circuit is electrically connected to the second multiplexer output terminal, and the at least one second phase setting circuit is controlled by the second clock signal.

8. The dynamic module according to claim 7, wherein in the precharge period,
    the first decision selection stage is disconnected to the first multiplexer output terminal, and
    the second decision selection stage is disconnected to the second multiplexer output terminal.

9. The dynamic module according to claim 7, wherein in the evaluation period,
the first decision selection stage is selectively electrically connected to the first multiplexer output terminal, and
the second decision selection stage is selectively electrically connected to the second multiplexer output terminal.

10. The dynamic module according to claim 1, wherein
the first multiplexer comprises a first positive output circuit and a first negative output circuit, and
the second multiplexer comprises a second positive output circuit and a second negative output circuit, wherein in the evaluation period,
one of the first positive output circuit and the second positive output circuit generates the first multiplexer output, and
one of the first negative output circuit and the second negative output circuit generates the second multiplexer output.

11. The dynamic module according to claim 10, wherein
when the first previous decision bit is in a first logic and the second previous decision bit is in a second logic, the first positive output circuit generates the first multiplexer output, and the first negative output circuit generates the second multiplexer output, and
when the first previous decision bit is in the second logic and the second previous decision bit is in the first logic, the second positive output circuit generates the first multiplexer output, and the second negative output circuit generates the second multiplexer output.

12. The dynamic module according to claim 10, wherein the at least one first phase setting circuit comprises:
a first-first phase setting circuit, electrically connected to the first decision selection stage, the first positive output circuit, and the first negative output circuit, configured for receiving the first clock signal and generating a first-first selection signal; and
a second-first phase setting circuit, electrically connected to the first decision selection stage, the first positive output circuit, and the first negative output circuit, configured for receiving the second clock signal and generating a second-first selection signal.

13. The dynamic module according to claim 12, wherein the at least one second phase setting circuit comprises:
a first-second phase setting circuit, electrically connected to the second decision selection stage, the second positive output circuit, and the second negative output circuit, configured for receiving the first clock signal and generating a first-second selection signal; and
a second-second phase setting circuit, electrically connected to the second decision selection stage, the second positive output circuit, and the second negative output circuit, configured for receiving the second clock signal and generating a second-second selection signal.

14. The dynamic module according to claim 13, wherein during the precharge period,
the first positive output circuit and the second positive output circuit stop generating the first multiplexer output, and
the first negative output circuit and the second negative output circuit stop generating the second multiplexer output.

15. The dynamic module according to claim 13, wherein in the evaluation period,
when the first previous decision bit is in a first logic and the second previous decision bit is in a second logic, the first-first selection signal is equivalent to the first previous decision bit, and the second-first selection signal is equivalent to the second previous decision bit; and
when the first previous decision bit is in the second logic and the second previous decision bit is in the first logic, the first-second selection signal is equivalent to the second previous decision bit, and the second-second selection signal is equivalent to the first previous decision bit.

16. The dynamic module according to claim 1, wherein in the evaluation period,
when the first previous decision bit is in a first logic and the second previous decision bit is in a second logic,
the first domino circuit updates the first multiplexer output with the first rail-output,
the first domino circuit updates the second multiplexer output with the second rail-output, and
the second domino circuit stops generating the first multiplexer output and the second multiplexer output.

17. The dynamic module according to claim 1, wherein in the evaluation period,
when the first previous decision bit is in a second logic and the second previous decision bit is in a first logic,
the first domino circuit stops generating the first multiplexer output and the second multiplexer output,
the second domino circuit updates the first multiplexer output with the third rail-output, and
the second domino circuit updates the second multiplexer output with the fourth rail-output.

18. The dynamic module according to claim 1, wherein the evaluation period and the precharge period are determined by the first clock signal and the second clock signal.

19. A decision feedback equalizer, comprising:
a first speculative path, configured for providing a first previous decision bit and a second previous decision bit in an evaluation period, wherein the first previous decision bit and the second previous decision bit are complementary; and
a second speculative path, electrically connected to the first speculative path, comprising:
a first sense amplifier, configured for outputting a first rail-to-rail output pair comprising a first rail-output and a second rail-output;
a second sense amplifier, configured for outputting a second rail-to-rail output pair comprising a third rail-output and a fourth rail-output; and
a dynamic module, electrically connected to the first sense amplifier and the second sense amplifier, comprising:
a first domino circuit, configured for generating a first multiplexer output, comprising:
a first multiplexer, configured for receiving two of the first rail-output, the second rail-output, the third rail-output, and the fourth rail-output;
at least one first phase setting circuit, configured for receiving a first clock signal; and
a first decision selection stage, electrically connected to the first multiplexer and the at least one first phase setting circuit, configured for receiving the first previous decision bit and the second previous decision bit; and
a second domino circuit, configured for generating a second multiplexer output, comprising:
a second multiplexer, configured for receiving the other two of the first rail-output, the second rail-output, the third rail-output, and the fourth rail-output;

at least one second phase setting circuit, configured for receiving a second clock signal, wherein the first clock signal and the second clock signal are complementary; and a second decision selection stage, electrically connected to the second multiplexer and the at least one second phase setting circuit, configured for receiving the first previous decision bit and the second previous decision bit, wherein in the evaluation period, the first multiplexer output and the second multiplexer output are selectively updated with one of the first rail-to-rail output pair and the second rail-to-rail output pair, and in a precharge period, the first and the second multiplexer outputs remain unchanged.

20. The decision feedback equalizer according to claim 19, wherein the dynamic module further comprises:

a storage circuit, electrically connected to the first domino circuit and the second domino circuit, configured for holding the first multiplexer output and the second multiplexer output during the precharge period.

21. The decision feedback equalizer according to claim 20, wherein the second speculative path further comprises:

a first inverter, electrically connected to the dynamic module, the storage circuit, and the first speculative path; and a second inverter, electrically connected to the dynamic module, the storage circuit, and the first speculative path, wherein during the precharge period, the first inverter converts the first multiplexer output to a third previous decision bit, and the second inverter converts the second multiplexer output to a fourth previous decision bit, wherein the first speculative path receives the third previous decision bit and the fourth previous decision bit.

22. The decision feedback equalizer according to claim 19, wherein the evaluation period and the precharge period are determined by the first clock signal and the second clock signal.

* * * * *